(12) United States Patent
MacKay

(10) Patent No.: US 7,592,761 B2
(45) Date of Patent: Sep. 22, 2009

(54) SYSTEM AND METHOD FOR STARTING AND OPERATING A MOTOR

(75) Inventor: David Kyle MacKay, Oakville (CA)

(73) Assignee: Agile Systems Inc., Waterloo, Ontario (CA)

( * ) Notice: Subject to any disclaimer, the term of this patent is extended or adjusted under 35 U.S.C. 154(b) by 777 days.

(21) Appl. No.: 11/237,907

(22) Filed: Sep. 29, 2005

(65) Prior Publication Data

US 2007/0069669 A1    Mar. 29, 2007

(51) Int. Cl.
*H02P 6/00* (2006.01)
*H02P 6/20* (2006.01)

(52) U.S. Cl. .............................. 318/254.1; 318/400.35; 318/400.01; 318/778

(58) Field of Classification Search ............ 318/400.01, 318/400.11, 400.26, 400.27, 400.35, 778, 318/785, 823, 254.1, 254.2
See application file for complete search history.

(56) References Cited

U.S. PATENT DOCUMENTS

| | | | |
|---|---|---|---|
| 3,663,878 A | 5/1972 | Miyasaka | |
| 4,136,308 A | 1/1979 | King | |
| 4,158,287 A | 6/1979 | Nakajima et al. | |
| 4,282,471 A | 8/1981 | Budniak et al. | |
| 4,282,472 A | 8/1981 | Martin | |
| RE31,229 E | 5/1983 | King | |
| 4,450,396 A | 5/1984 | Thornton | |
| 4,480,218 A | 10/1984 | Hair | |
| 4,510,429 A | 4/1985 | Squire | |
| 4,556,836 A | 12/1985 | Antognini | |
| 4,654,566 A | 3/1987 | Erdman | |
| 4,658,194 A | 4/1987 | Richter et al. | |
| 4,684,866 A | 8/1987 | Nehmer et al. | |
| 4,734,632 A | 3/1988 | Kamikura et al. | |
| 4,740,734 A * | 4/1988 | Takeuchi et al. | 318/400.26 |
| 4,743,815 A | 5/1988 | Gee et al. | |
| 4,772,839 A * | 9/1988 | MacMinn et al. | 318/696 |
| 4,845,418 A | 7/1989 | Conner | |
| 4,876,491 A | 10/1989 | Squires et al. | |
| 4,896,089 A | 1/1990 | Kliman et al. | |
| 4,922,163 A | 5/1990 | McKee et al. | |
| 4,922,169 A | 5/1990 | Freeman | |
| 5,028,852 A | 7/1991 | Dunfield | |
| 5,068,582 A | 11/1991 | Scott | |
| 5,107,195 A * | 4/1992 | Lyons et al. | 318/701 |
| 5,191,270 A | 3/1993 | McCormack | |
| 5,227,709 A | 7/1993 | Gauthier et al. | |
| 5,235,264 A | 8/1993 | Kaneda et al. | |

(Continued)

FOREIGN PATENT DOCUMENTS

JP    61058499    3/1986

*Primary Examiner*—Walter Benson
*Assistant Examiner*—Eduardo Colon-Santana
(74) *Attorney, Agent, or Firm*—McCarthy Tetrault LLP

(57) ABSTRACT

A method for determining an initial position of a rotor of a polyphase motor is described. The method comprises determining current change values from a plurality of phases of the motor during saturation of the motor relating to the initial position of the rotor; identifying a set of modelled current change values according to a modelled behaviour of the motor, in which the modelled current change values represents modelled positions of the rotor under the modelled behaviour; and comparing the current change values to the set of modelled current change values to identify the initial rotor position from the modelled positions. A system implementing the method is also described.

18 Claims, 22 Drawing Sheets

U.S. PATENT DOCUMENTS

| | | | |
|---|---|---|---|
| 5,334,917 A * | 8/1994 | Lind ................... 318/400.35 |
| 5,339,012 A | 8/1994 | Schroedl et al. |
| 5,378,975 A | 1/1995 | Schweid et al. |
| 5,530,326 A | 6/1996 | Galvin et al. |
| 5,726,549 A | 3/1998 | Okuno et al. |
| 5,796,231 A | 8/1998 | Kyodo |
| 5,903,129 A | 5/1999 | Okuno et al. |
| 5,990,643 A | 11/1999 | Holling et al. |
| 6,104,113 A | 8/2000 | Beifus |
| 6,107,772 A * | 8/2000 | Liu et al. ................... 318/701 |
| 6,121,736 A * | 9/2000 | Narazaki et al. ....... 318/400.35 |
| 6,441,572 B2 | 8/2002 | Batzel |
| 6,555,988 B2 | 4/2003 | Masakic et al. |
| 6,570,351 B2 | 5/2003 | Miyazaki et al. |
| 6,586,898 B2 | 7/2003 | King et al. |
| 6,650,082 B1 | 11/2003 | Du |
| 6,686,714 B2 | 2/2004 | Trifilo |
| 6,707,265 B2 | 3/2004 | Imai et al. |
| 6,756,749 B2 | 6/2004 | Haas et al. |
| 6,762,575 B2 | 7/2004 | Douglas |
| 7,095,205 B2 * | 8/2006 | Ehsani et al. ............. 318/254.1 |
| 7,256,564 B2 * | 8/2007 | MacKay ................. 318/400.34 |
| 7,279,860 B2 * | 10/2007 | MacKay ................. 318/400.34 |
| 7,288,911 B2 * | 10/2007 | MacKay ................. 318/400.21 |
| 7,301,376 B2 * | 11/2007 | Capodivacca et al. ....... 327/112 |
| 2005/0154545 A1 * | 7/2005 | Ramu et al. .................... 702/65 |
| 2007/0069677 A1 * | 3/2007 | MacKay ..................... 318/439 |
| 2007/0164691 A1 * | 7/2007 | MacKay ......................... 318/1 |

\* cited by examiner

SYSTEM AND METHOD FOR STARTING AND OPERATING A MOTOR

FIELD OF INVENTION

The present invention relates to a system and method for starting and operating a motor, particularly a brushless DC motor.

BACKGROUND OF THE INVENTION

Polyphase brushless DC motors apply separate currents to stator windings of the motor in sequential order to produce torque-inducing flux for causing motion in a magnetic or ferromagnetic rotor of the motor. Typically, DC currents are alternatively applied to different stator windings to create current paths in a synchronized fashion to produce different magnetic flux orientations that produce torque on the rotor, and thus causing its rotational movement.

In order to ensure that current is applied to the proper motor phase to set up the proper flux generating current path, it tends to be advantageous to know the position of the rotor such that the windings may be energized in such a way that maximum torque is provided to the rotor. This may be particularly valuable when the motor is initially starting up and the rotor is stationary.

SUMMARY OF THE INVENTION

In an aspect of the present invention, there is a method for determining an initial position of a rotor of a polyphase motor. The method comprises: determining current change values from a plurality of phases of the motor during saturation of the motor relating to the initial position of the rotor; identifying a set of modelled current change values according to a modelled behaviour of the motor, the modelled current change values representing modelled positions of the rotor under the modelled behaviour; and comparing the current change values to the set of modelled current change values to identify the initial rotor position from the modelled positions.

The each current change value may be obtained by: providing a first current pulse through a pair of phases of the plurality of phases in a first direction, and observing a first resulting current appearing on the pair of phases; providing a second current pulse through the pair of phases in a second direction opposed to the first direction, and observing a second resulting current appearing on the pair of phases; and obtaining the each current change value as the difference between the first resulting current and the second resulting current.

The first current pulse may have a magnitude and duration, and the second current pulse may have the same magnitude and duration.

The method may further comprise, prior to the comparing the current change values to the set of modelled current change values: transforming the current change values into a lower dimensional space; and transforming the set of modelled current values into the lower dimensional space. The comparing the current change values to the modelled current change values may include comparing the transformed current change values to the transformed modelled current change values.

The motor may be a three-phase motor. The each current change value may relate to a respective pair of phases of the motor. The current change values may be a triplet of values, and which may be transformed into an ordered pair in the lower dimensional space.

The rotor may rotate around a rotational space of the motor divided into a plurality of sectors, and each value of the set of modelled current change values may correspond to the modelled behaviour of the motor when the rotor is at a midpoint of each of the respective plurality of sectors.

The comparing the current change values and the modelled current change values may include: identifying the rotor as within one of the plurality of sectors of rotational space of the motor, each of the plurality of sectors being associated with a respective modelled current change value at the midpoint of the sector. The identifying may comprise: obtaining a set of differences between the current change values to each modelled current change value at the midpoint of each of the plurality of sectors; determining a difference in the set of differences that is the smallest, and the sector of the plurality of sectors associated with the difference that is the smallest; and identifying the rotor as within the sector of the plurality of sectors associated with the difference that is the smallest.

In another aspect of the present invention, there is a system for determining an initial position of a rotor of a polyphase motor. The system comprises: sense circuitry for determining current change values from a plurality of phases of the motor during saturation of the motor relating to the initial position of the rotor; a motor controller for identifying a set of modelled current change values according to a modelled behaviour of the motor, the modelled current change values representing modelled positions of the rotor under the modelled behaviour, the motor controller receiving the current change values from the sense circuitry and comparing the current change values to the set of modelled current change values to identify the initial rotor position from the modelled positions.

The each current change value may be obtained by: providing a first current pulse through a pair of phases of the plurality of phases in a first direction, and the sense circuitry observing a first resulting current appearing on the pair of phases; providing a second current pulse through the pair of phases in a second direction opposed to the first direction, and the sense circuitry observing a second resulting current appearing on the pair of phases; and obtaining the each current change value as the difference between the first resulting current and the second resulting current.

The first current pulse may have a magnitude and duration, and the second current pulse may have the same magnitude and duration.

Prior to the motor controller comparing the current change values to the set of modelled current change values, the motor controller may: transform the current change values into a lower dimensional space; and transform the set of modelled current values into the lower dimensional space. The comparing the current change values to the modelled current change values by the motor controller may include comparing the transformed current change values to the transformed modelled current change values.

The motor is may be three-phase motor. The each current change value may relate to a respective pair of phases of the motor. The current change values may be a triplet of values, and which may be transformed into an ordered pair in the lower dimensional space.

The rotor may rotate around a rotational space of the motor divided into a plurality of sectors, and each value of the set of modelled current change values may correspond to the modelled behaviour of the motor when the rotor is at a midpoint of each of the respective plurality of sectors.

The comparing the current change values and the modelled current change values by the motor controller may include: identifying the rotor as within one of the plurality of sectors of rotational space of the motor, each of the plurality of sectors being associated with a respective modelled current change value at the midpoint of the sector. The identifying may comprise: obtaining a set of differences between the inductance change values to each modelled current change value at the midpoint of each of the plurality of sectors; determining a difference in the set of differences that is the smallest, and the sector of the plurality of sectors associated with the difference that is the smallest; and identifying the rotor as within the sector of the plurality of sectors associated with the difference that is the smallest.

The motor controller may include a digital signal processor.

In another aspect of the present invention, there is a method for determining back electromotive force (EMF) in a polyphase motor. The method comprises: monitoring back EMF in the motor after a commutation of the motor; and evaluating the back EMF only after a back EMF event occurs after the commutation of the motor.

The monitoring back EMF may include: obtaining a first back EMF value at a first time; at a second time subsequent to the first time, obtaining a second back EMF value; and determining a difference between the first back EMF value and the second back EMF value.

If a spike in the back EMF is observed, then the pre-determined back EMF event may be an end to the spike. If a spike in the back EMF is not observed within a pre-determined period of time after the commutation of the motor, then the pre-determined back EMF event may be an end to the pre-determined period of time.

If a spike in the back EMF is observed, then the spike in the observed back EMF may have a first foot, a peak and a second foot; and the first foot may correspond to the commutation of the motor and the second foot may correspond to the end of the spike in the back EMF.

If a spike in the back EMF is observed, then the evaluating the observed back EMF may include disregarding the back EMF that is observed until the end of the spike and determining the end of the spike. The determining the end of the spike may comprise: evaluating whether the difference between the first and second back EMF values signifies that the observed back EMF is between the first foot and the peak of the spike, and if so, noting that the peak of the spike has been passed; and if the peak of the spike has been passed, evaluating whether the difference between the first and second back EMF values signifies that the observed back EMF is past the second foot of the spike and so determining the end to the spike in the observed back EMF. If a spike in the back EMF is not observed, then the evaluating the observed back EMF may include disregarding the back EMF that is observed until the end of the pre-determined period of time.

The pre-determined period of time may correspond to a time period expiring before a next commutation of the motor at a present speed of the motor.

The obtaining the first back EMF value may comprises obtaining a first average voltage level across each winding of the motor at the first time, and the obtaining the second back EMF value may comprise obtaining a second average voltage level across the each winding of the motor at the second time.

The difference between the first and second back EMF values may signify that the observed back EMF is between the first foot and the peak of the spike, and the difference may signify that the observed back EMF is past the second foot of the spike, if the difference is greater than a pre-determined hysteresis value. The motor may be a three-phase motor.

In another embodiment of the invention, there is a system for determining back electromotive force (EMF) in a polyphase motor. The system comprises: sense circuitry for monitoring back EMF in the motor after a commutation of the motor; and a motor controller for receiving the back EMF and evaluating the back EMF only after a back EMF event occurs after the commutation of the motor.

The monitoring the back EMF may include: the sense circuitry obtaining a first back EMF value at a first time, and the sense circuitry obtaining, at a second time subsequent to the first time, a second back EMF value. The motor controller may determine a difference between the first back EMF value and the second back EMF value.

If a spike in the back EMF is observed by the sense circuitry and the motor controller, then the pre-determined back EMF event may be an end to the spike. If a spike in the back EMF is not observed by the sense circuitry and the motor controller within a pre-determined period of time after the commutation of the motor, then the pre-determined back EMF event may be an end to the pre-determined period of time.

If a spike in the back EMF is observed, then the spike in the observed back EMF may have a first foot, a peak and a second foot; and the first foot may correspond to the commutation of the motor and the second foot may correspond to the end of the spike in the back EMF.

If a spike in the back EMF is observed, then the evaluating the observed back EMF by the motor controller may include disregarding the back EMF that is observed until the end of the spike and determining the end of the spike. The determining the end of the spike may comprise: evaluating whether the difference between the first and second back EMF values signifies that the observed back EMF is between the first foot and the peak of the spike, and if so, noting that the peak of the spike has been passed; and if the peak of the spike has been passed, evaluating whether the difference between the first and second back EMF values signifies that the observed back EMF is past the second foot of the spike and so determining the end to the spike in the observed back EMF. If a spike in the back EMF is not observed, then the evaluating the observed back EMF by the motor controller may include disregarding the back EMF that is observed until the end of the pre-determined period of time.

The pre-determined period of time may correspond to a time period expiring before a next commutation of the motor at a present speed of the motor.

The obtaining the first back EMF value may comprises the sense circuitry obtaining a first average voltage level across each winding of the motor at the first time, and the obtaining the second back EMF value may comprise the sense circuitry obtaining a second average voltage level across the each winding of the motor at the second time.

The difference between the first and second back EMF values may signify that the observed back EMF is between the first foot and the peak of the spike, and the difference may signify that the observed back EMF is past the second foot of the spike, if the difference is greater than a pre-determined hysteresis value. The motor may be a three-phase motor. The motor controller may include a digital signal processor.

In another aspect of the present invention, there is a method for evaluating observed back electromotive force (EMF) in a polyphase motor. The method comprises: monitoring a total current appearing on all phase windings of the motor after a rotor of the motor begins to rotate; and evaluating back EMF only after the total current is within a pre-determined margin of the current supplied to the motor.

The current supplied to the motor may be provided to the phase windings of the motor by a bridge circuit connected to the phase windings, and the monitoring the total current may include obtaining the current appearing across the bridge circuit.

The pre-determined margin may be selected so that the back EMF is evaluated only after an error component of the total current has decayed below a negligible value as signified by the total current being with the pre-determined margin of the current supplied to the motor. The motor may be a three-phase motor.

In another aspect of the present invention, there is a system for evaluating observed back electromotive force (EMF) in a polyphase motor. The system comprises: sense circuitry for monitoring a total current appearing on all phase windings of the motor after a rotor of the motor begins to rotate; and a motor controller for receiving the total current and evaluating back EMF only after the total current is within a pre-determined margin of the current supplied to the motor.

The current supplied to the motor may be provided to the phase windings of the motor by a bridge circuit connected to the phase windings, and the monitoring the total current by the sense circuitry may include obtaining the current appearing across the bridge circuit.

The pre-determined margin may be selected so that the back EMF is evaluated only after an error component of the total current has decayed below a negligible value as signified by the total current being with the pre-determined margin of the current supplied to the motor. The motor may be a three-phase motor. The motor controller may include a digital signal processor.

In another aspect of the present invention, there is a system for controlling a polyphase motor. The system comprises: phase windings in the motor for energizing stators to cause rotational motion of a rotor of the motor as energy is applied to one or more phase windings; a bridge circuit having a branch circuit connected to one of the phase windings of the motor, the branch circuit having a first FET, a second FET, and a capacitor to trigger the gate of the FET, the capacitor connected at one end to the junction between the first and second FETs. While the second FET is conducting the capacitor is charging and while the first FET is conducting, the charge on the capacitor alone is used to hold the first FET in a conducting state.

The system may further comprise a motor controller for controlling when the first and second FETs are conducting.

The motor controller may apply a first pulse width modulation (PWM) signal to the first FET and a second PWM signal to the second FET to control when the first and second FETs are conducting. The motor controller may apply the first and second PWM signals according to a plurality of commutation states each of which setting out whether the first FET should be conducting and whether the second FET should be conducting, the commutation states rotating such that the second FET is conducting prior to the first FET is conducting. The motor controller may rotates between the plurality of commutation states at a frequency that is faster than a discharge speed of the capacitor.

The first and second PWM signals may be provided at the frequency of rotation between the plurality of commutation states.

The plurality of commutation states may comprises six states, and: the first state may set the first FET to be not conducting and the second FET to be conducting; the second state may set the first FET to be not conducting and the second FET to be conducting; the third state may set the first FET to be not conducting and the second FET to be not conducting; the fourth state may set the first FET to be conducting and the second FET to be not conducting; the fifth state may set the first FET to be conducting and the second FET to be not conducting; and the sixth state may set the first FET to be not conducting and the second FET to be not conducting.

The motor may be a three-phase motor, and a branch circuit may be provided with the bridge circuit for each phase of the three-phase motor. The motor controller may include a digital signal processor.

In another embodiment of the present invention, there is a method for controlling a polyphase motor, the motor having phase windings for energizing stators to cause rotational motion of a rotor of the motor as energy is applied to one or more phase windings. The method comprises: providing current to each respective phase winding through a respective a branch circuit of a bridge circuit that is connected to the each respective phase winding, the branch circuit having a first FET, a second FET, and a capacitor to trigger the gate of the FET, the capacitor connected at one end to the junction between the first and second FETs. While the second FET is conducting to provide current to the each respective phase winding the capacitor is charging, and while the first FET is conducting to provide current to the each respective phase winding the charge on the capacitor alone is used to hold the first FET in a conducting state.

A motor controller may be connected to the bridge circuit for controlling when the first and second FETs are conducting. The motor controller may apply a first pulse width modulation (PWM) signal to the first FET and a second PWM signal to the second FET to control when the first and second FETs are conducting. The motor controller may apply the first and second PWM signals according to a plurality of commutation states each of which setting out whether the first FET should be conducting and whether the second FET should be conducting, the commutation states rotating such that the second FET is conducting prior to the first FET is conducting. The motor controller may rotate between the plurality of commutation states at a frequency that is faster than a discharge speed of the capacitor.

The first and second PWM signals may be provided at the frequency of rotation between the plurality of commutation states. The motor may be a three-phase motor.

The plurality of commutation states may comprises six states, and: the first state may set the first FET to be not conducting and the second FET to be conducting; the second state may set the first FET to be not conducting and the second FET to be conducting; the third state may set the first FET to be not conducting and the second FET to be not conducting; the fourth state may set the first FET to be conducting and the second FET to be not conducting; the fifth state may set the first FET to be conducting and the second FET to be not conducting; and the sixth state may set the first FET to be not conducting and the second FET to be not conducting.

In another embodiment of the present invention, there is a method for adjusting a rotational speed of a rotor in a polyphase motor from a first speed towards a second, faster speed when the motor is commutating according to a commutation scheme at a first commutation phase angle. The method comprises: selecting an advanced phase angle relative to the first commutation phase angle for commutating the motor; and adjusting the commutation scheme to be commutating at the advanced phase angle, so that the rotational speed of the rotor increases from the first speed towards the second speed as the motor is commutating at the advanced phase angle.

The first commutation phase angle may be determined with respect to a first back EMF voltage, the commutation scheme may commutate when the first back EMF voltage is detected in the motor, and the adjusting the commutation scheme may includes: determining a second back EMF voltage corresponding to the advanced phase angle; and adjusting the commutation scheme to commutate when the second back EMF voltage is observed.

The determining the second back EMF voltage may include: calculating a rate of change of back EMF in the motor at the first speed using a back EMF constant of the motor; and determining the second back EMF voltage according to the rate of change in respect of the advanced phase angle.

The steps of selecting the advanced phase angle and adjusting the commutation scheme may be steps of a feedback control loop for adjusting the rotational speed of the rotor towards the second speed. The feedback control loop may further comprise the steps of: evaluating a present speed of rotation of the rotor; and if the present speed is less than the second speed, then setting the present speed as the first speed and repeating the steps of selecting the advanced phase angle, adjusting the commutation scheme, and evaluating the present speed of rotation of the rotor. The motor may be a three-phase motor.

In another embodiment of the present invention, there is a system for adjusting a rotational speed of a rotor in a polyphase motor from a first speed towards a second, faster speed when the motor is commutating according to a commutation scheme at a first commutation phase angle. The system comprises: a motor controller for selecting an advanced phase angle relative to the first commutation phase angle for commutating the motor, the motor controller adjusting the commutation scheme to be commutating at the advanced phase angle so that the rotational speed of the rotor increases from the first speed towards the second speed as the motor is commutating at the advanced phase angle.

The first commutation phase angle may determined with respect to a first back EMF voltage, the commutation scheme may commutate when the first back EMF voltage is detected in the motor, and the adjusting the commutation scheme by the motor controller may include: determining a second back EMF voltage corresponding to the advanced phase angle; and adjusting the commutation scheme to commutate when the second back EMF voltage is observed.

The determining the second back EMF voltage by the motor controller may includes calculating a rate of change of back EMF in the motor at the first speed using a back EMF constant of the motor; and determining the second back EMF voltage according to the rate of change in respect of the advanced phase angle.

The steps of selecting the advanced phase angle and adjusting the commutation scheme may be steps of a feedback control loop being executed by the motor controller for adjusting the rotational speed of the rotor towards the second speed. The feedback control loop may further comprise the steps of: evaluating a present speed of rotation of the rotor; and if the present speed is less than the second speed, then: setting the present speed as the first speed; and repeating the steps of selecting the advanced phase angle, adjusting the commutation scheme, and evaluating the present speed of rotation of the rotor. The motor is may be a three-phase motor, and the motor controller may be a digital signal processor.

In another embodiment of the present invention, there is a method for attenuating switching noise from back electromotive force (EMF) observations in a motor controlled by pulse width modulation (PWM) signals provided at a PWM frequency. The method comprises: sampling back EMF observed in the motor at a sampling frequency at least two times greater than the PWM frequency to obtain over-sampled back EMF readings; and filtering the over-sampled back EMF readings to remove switching noise and obtain cleaned back EMF observations.

The filtering may be performed by a digital filter. The digital filter may have a cutoff frequency approximately half of the frequency of the PWM signals. The digital filter may attenuate signals below the cutoff frequency by at least 12 decibels. The motor may be a three-phase motor.

In another embodiment of the present invention, there is a system for attenuating switching noise from back electromotive force (EMF) observations in a motor controlled by pulse width modulation (PWM) signals provided at a PWM frequency. The system comprises: sense circuitry for sampling back EMF observed in the motor at a sampling frequency that is at least two times greater than the PWM frequency to obtain over-sampled back EMF readings; and a motor controller for receiving the over-sampled back EMF and filtering the over-sampled back EMF readings to remove switching noise and obtain cleaned back EMF observations.

A digital filter may be provided with the motor controller for filtering the over-sampled back EMF. The digital filter may have a cutoff frequency approximately half of the frequency of the PWM signals. The digital filter may attenuate signals below the cutoff frequency by at least 12 decibels. The motor is a three-phase motor, and the motor controller may include a digital signal processor.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2b is a diagram showing a rotor of the motor of FIG. 1 within the logical sectors of FIG. 2a;

FIG. 18b is a graphical representation of a sampling waveform corresponding to the pulse wave modulation waveforms of FIG. 17a.

DETAILED DESCRIPTION OF AN EMBODIMENT

Figure 1:
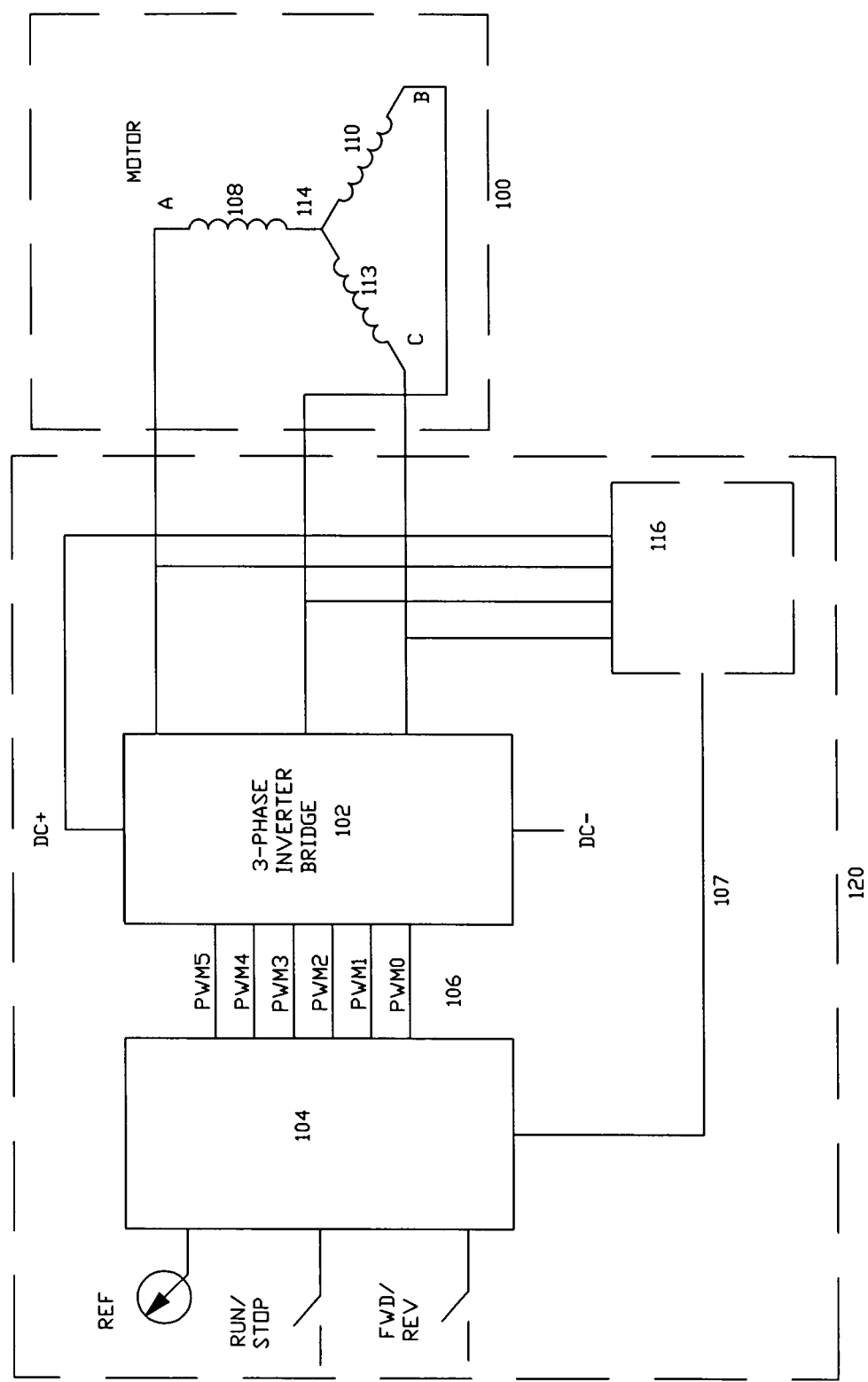
FIG. 1 is a block diagram of an exemplary three-phase brushless DC motor and its associated control circuitry incorporating an embodiment.

The description that follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

The exemplary embodiment described below makes reference to a three-phase brushless DC motor having a two-pole rotor. However, it will be appreciated by those of skill in this art that, with modifications known in the art, the present invention is applicable to other motors.

The embodiment provides several features for controlling a motor to improve its performance. Some of the features can be combined while others operate independently of the other features. Briefly, the features comprises: (1) a rotor position estimation method, providing a technique for identifying an initial at-rest position of a rotor; (2) Back EMF detection on windings; (3) Phase-advance commutation for a rotor; (4) Rotor start-up back EMF detection; (5) Increased application of voltage to phase windings; and (6) another Back EMF detection for windings. Each is described in turn.

Rotor Position Estimation

Referring to FIG. 1, there is shown a motor 100 having three phases: phase "A", phase "B" and phase "C". Each of phases A, B and C comprise stators having windings thereon, which are connected to motor controller circuits 120 via phase windings 108, 110 and 112, respectively. Phases A, B and C are spaced 120 degrees apart, and motor 100 also includes rotor 114. Rotor 114 is made up of a permanent magnet having two poles, north and south (shown as "N" and "S" respectively in FIG. 2b).

Control circuits 120 connected to motor 100 includes motor driver and controller 104 that provides pulse wave modulation (PWM) signals 106 to three-phase inverter bridge circuit 102. Three-phase inverter bridge circuit 102 in turn provides DC current to one or more phases of motor 102 through phase windings 108, 110 and 112. Windings 108, 110 and 112 are also connected to a commutation voltage detection circuit 116, which is connected to motor driver and controller 104 via feedback bus 107.

As the windings 108, 100 and 112 of motor phases A, B and C are energized with current, a magnetic field is generated by the windings. To cause rotational motion of rotor 114, the phases A, B and C are energized in a synchronized order so that the magnetic field produced by the windings of motor 100 interact with the magnetic rotor 114. Torque occurs in rotor 114 with respect to the stationary stators of each phase of motor 100 when the generated magnetic field is correctly positioned with respect to rotor 114. Since the magnetic rotor 114 tends to align itself with its surrounding magnetic field, maximum torque tends occurs when the magnetic field leads rotor 114 by 90 degrees. In order to keep rotor 114 spinning, the magnetic field generated by phases A, B and C must be continually adjusted by varying current paths set up across the windings of each phase as the rotor spins by it. This adjusting of current paths is known in the art as commutation.

To start motor 100 from standstill, it is advantageous to know the position of rotor 114, so that proper commutation may be initiated such that the correct phase(s) are energized to generate a magnetic field to impart a maximum torque on rotor 114, i.e. torque applied to 90° leading rotor 114.

Figure 2A:
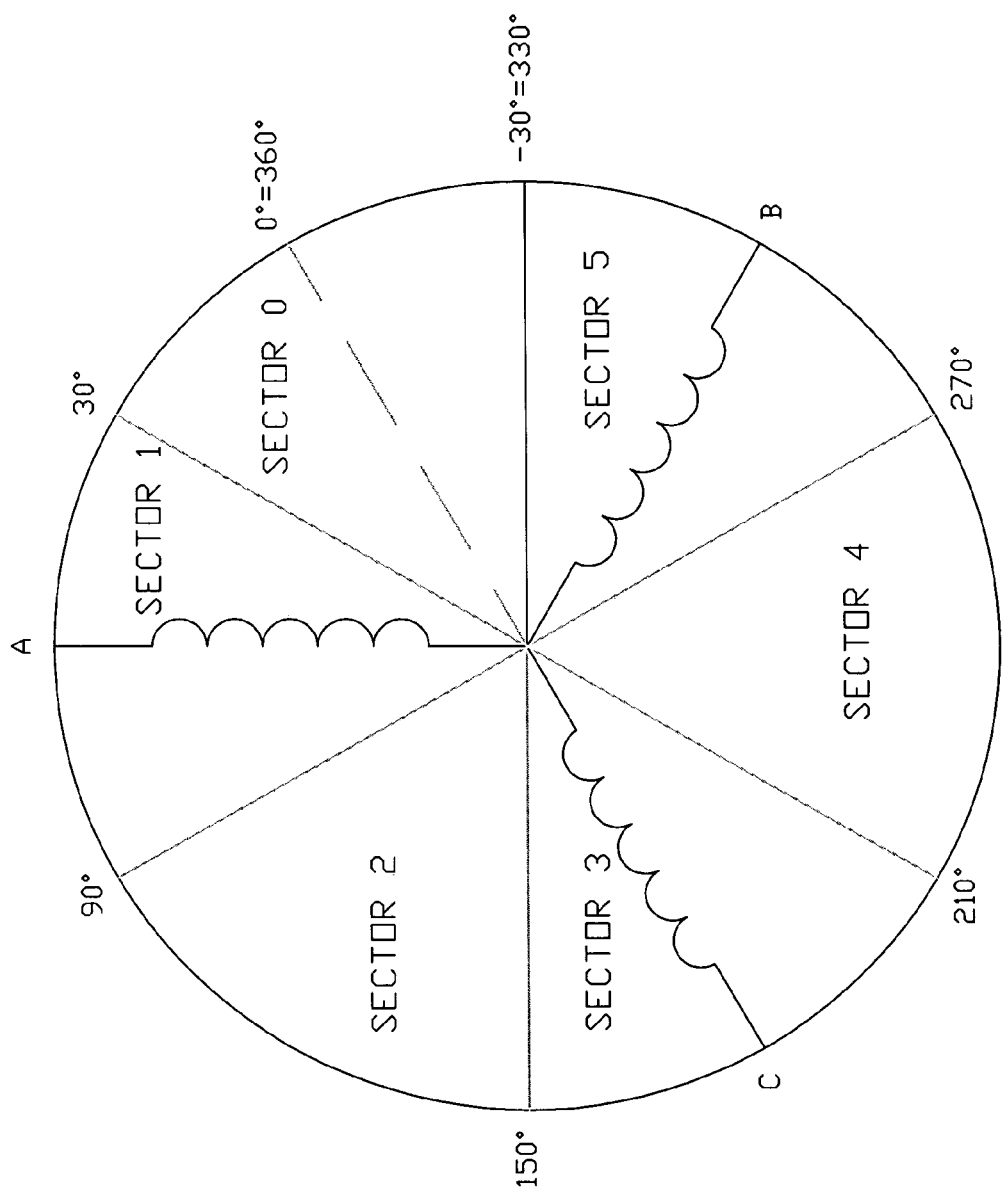
FIG. 2a is a diagram of logical sectors of rotation associated with the motor of FIG. 1.
Figure 2B:
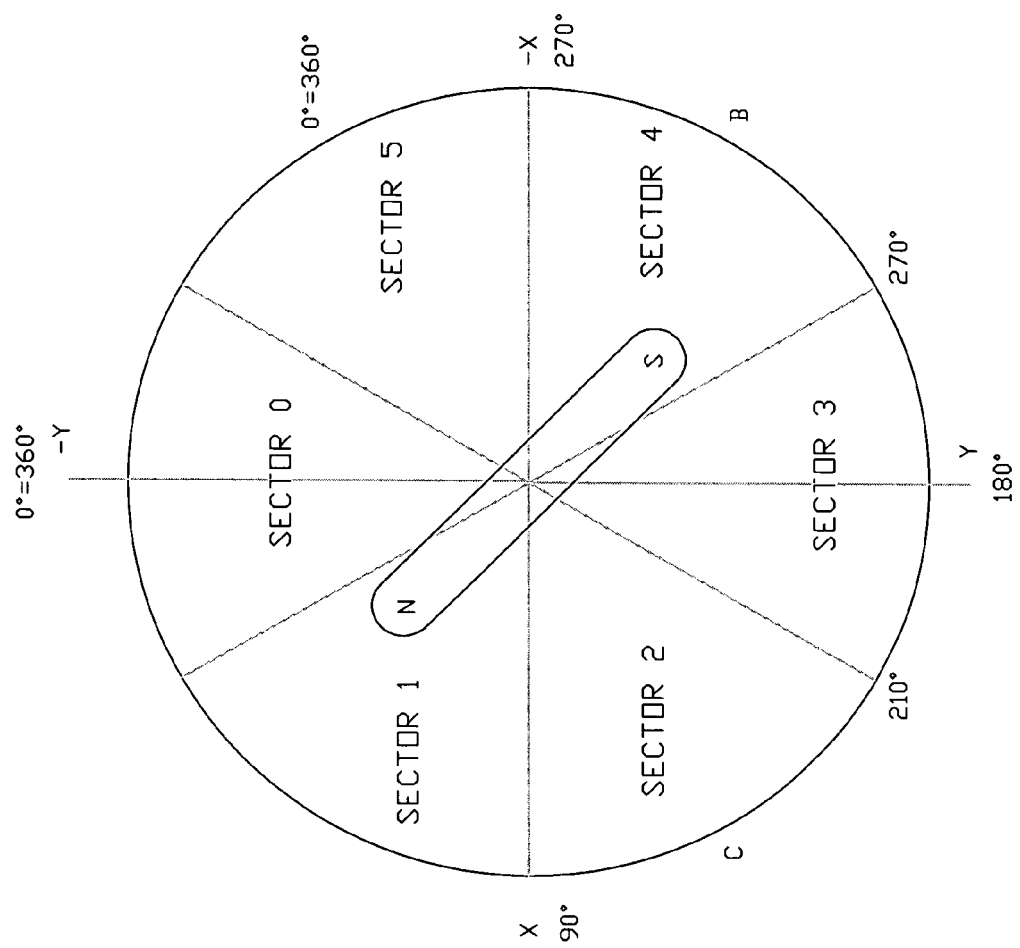

Referring to FIG. 2, the physical space 200 within motor 100 over which rotor 114 rotates is divided into six sectors of 60 degrees each. In FIG. 2, these sectors are labelled Sector 0 (occupying −30 to +30 degrees), Sector 1 (occupying 30 to 90 degrees), Sector 2 (occupying 90 to 150 degrees), Sector 3 (occupying 150 to 210 degrees), Sector 4 (occupying 210 to 270 degrees) and Sector 5 (occupying 270 to 330 degrees). Depending on the position of rotor 114 in space 200 and the commutation technique employed, different phase(s) of motor 100 may be energized to initiate rotation of rotor 114. For the embodiment, rotor 114 is considered to be in a sector if the north pole of rotor 114 is within the sector.

Figure 3:
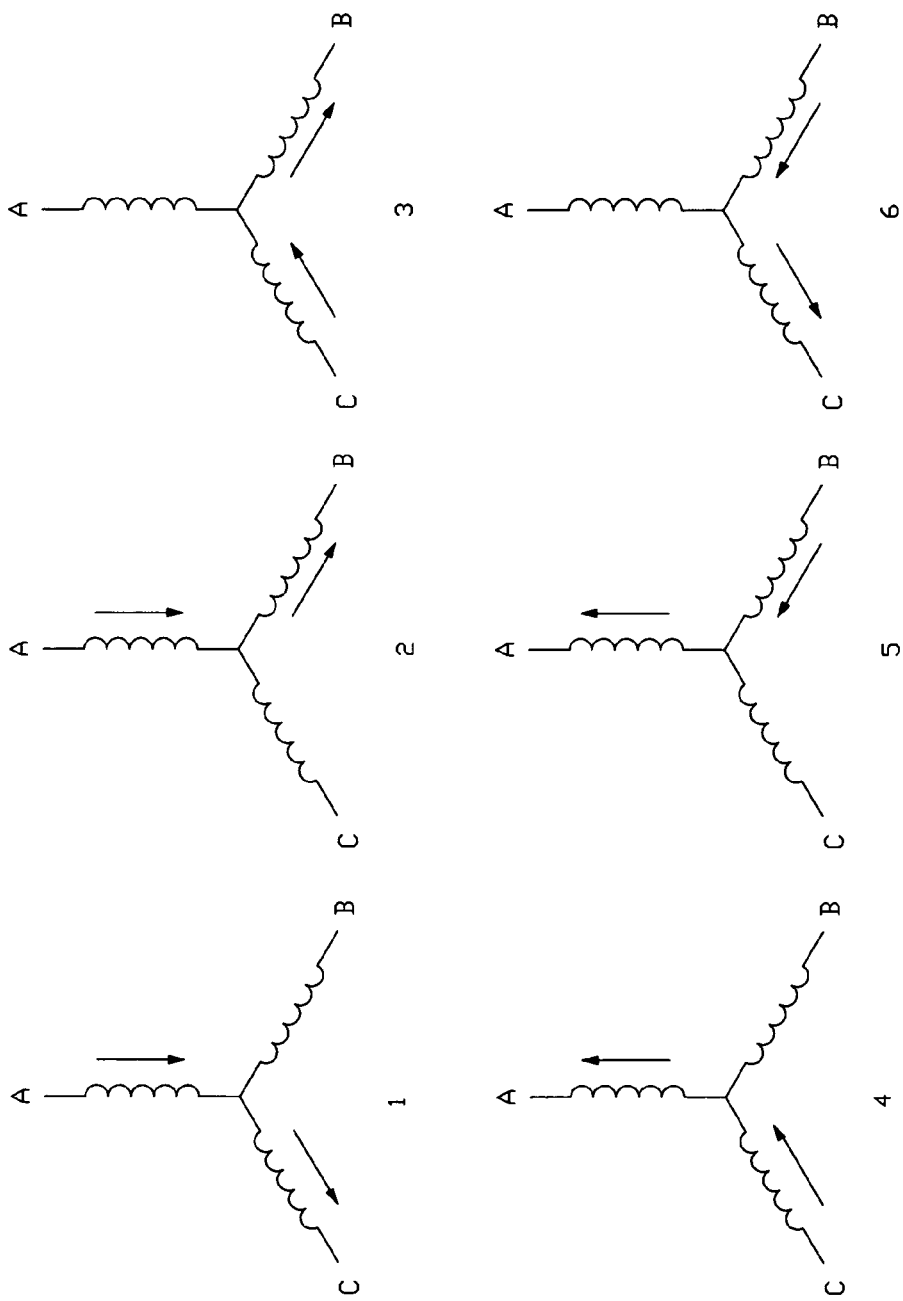
FIG. 3 shows different commutation states of the motor of FIG. 1.

For example, if a "six-step" commutation is utilized, in which full positive voltage is applied to a first phase, full negative voltage is applied to a second phase, and a third phase is left floating (i.e., off or tri-state), there is produced six possible magnetic flux fields that are produced. These fields are produced by way of the commutation states shown in FIG. 3:

In state (1): phase A is energized to a positive voltage while phase C is energized to a negative voltage, and phase B is off (i.e., left floating). In this state (1), a current path is established from phase A to C.

In state (2): phase A is energized to a positive voltage while phase B is energized to a negative voltage, and phase C is left floating. In this state (2), a current path is established from phase A to B.

In state (3): phase C is energized to a positive voltage while phase B is energized to a negative voltage, and phase A is left floating. In this state (3), a current path is established from phase C to B.

In state (4): phase C is energized to a positive voltage while phase A is energized to a negative voltage, and phase B is left floating. In this state (4), a current path is established from phase C to A.

In state (5): phase B is energized to a positive voltage while phase A is energized to a negative voltage, and phase C is left floating. In this state (5), a current path is established from phase B to A.

In state (6): phase B is energized to a positive voltage while phase C is energized to a negative voltage, and phase A is left floating. In this state (6), a current path is established from phase B to C.

It will be appreciated from the above that during six-step commutation, two of the three phases will be on, while one phase is off. Utilizing six-step commutation, one pattern of commutation state to select based on the position of rotor 114 which tends to optimize torque is summarized in the following table:

| Position of Rotor 114 | Commutation State to Select |
| --- | --- |
| Sector 0 | State (2) |
| Sector 1 | State (3) |
| Sector 2 | State (4) |
| Sector 3 | State (5) |
| Sector 4 | State (6) |
| Sector 5 | State (1) |

In the embodiment, the position of rotor 114 may be determined by exploiting the inductive characteristics of the stators of motor 100 using electrical and magnetic intersections between current present on the windings 108, 110 and 112 and any current induced on the windings by rotor 114. The stators of motor 100 each have a core over which windings 108, 110 and 112 are wound. The core, typically composed of iron, moves towards saturation and provides less inductance as the current in the windings increases. However, another magnetic field, such as the field generated by rotor 114, will also tend to move the cores of motor 100 closer to saturation and lower inductance. As the inductance of the cores change due to saturation, the current measured across the windings of the cores will also vary with the inductance. The position of rotor 114 therefore causes a variation in the ideal saturation behaviour characteristics of motor 100 that can be observed and utilized to estimate the position of rotor 114.

For the embodiment, the position of rotor 114 is estimated in part by providing short current pulses in different pairs of motor phases, with each pair of phases being energized first by a pulse in one polarity, and then a pulse of the opposite polarity. Each current pulse is injected into a phase pair for a period of time, after which the peak current appearing across the winding pair is measured. As there are three phase pairs: phases A and B; phases B and C; and phases A and C, there will be three pairs of peak current measurements made for the exemplary three-phase motor 100, with six measurements in total:

$I_{peakAB+}$; $I_{peakAB-}$
$I_{peakBC+}$; $I_{peakBC-}$
$I_{peakCA+}$; $I_{peakCA-}$ Preferably the size of the currents are relatively small and the duration relatively short so that rotor 114 does not start rotating, but large enough to allow the measurements to be made. In some embodiments, currents which cause small movements of rotor 14 may also be used.

Figure 4:
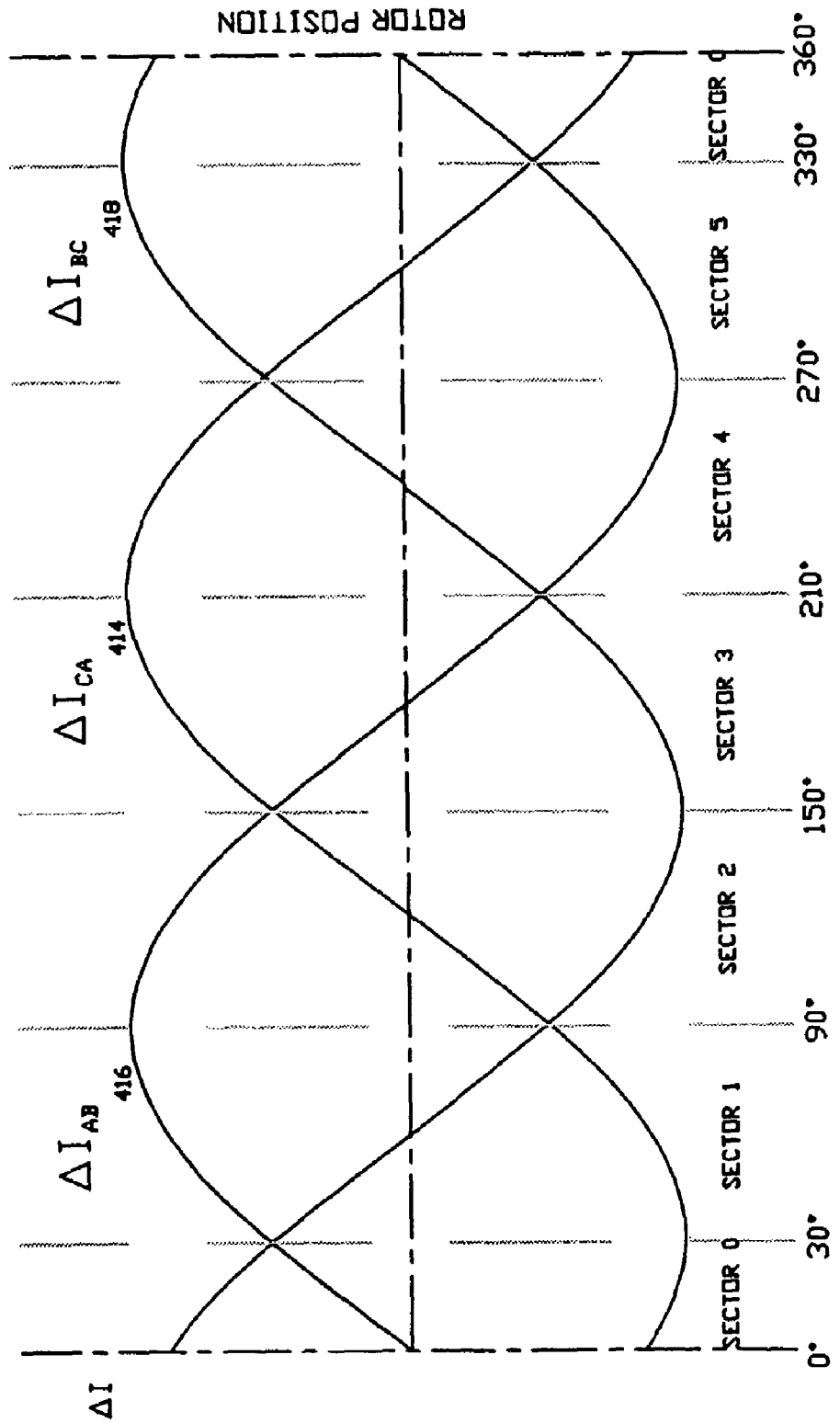
FIG. 4 is a graphical representation of idealized saturation vector behaviour of motor phases of the motor of FIG. 1.

From the peak currents, the difference between the absolute values of each pair of peak currents is taken to create saturation vectors for each pair:

$\Delta I_{AB} = |I_{peakAB+}| - |I_{peakAB-}|$ $\Delta I_{BC} = |I_{peakBC+}| - |I_{peakBC-}|$ $\Delta I_{CA} = |I_{peakCA+}| - |I_{peakCA-}|$ The values $\Delta I_{AB}$, $\Delta I_{BC}$, and $\Delta I_{CA}$ may be considered to be saturation vectors for each phase pair of motor 100, which represent the changes in inductance at saturation resulting from the magnetic field of rotor 114 at its current static position. For the embodiment, the position of rotor 114 is estimated from the peak current measurements made. The characteristics of $\Delta I_{AB}$, $\Delta I_{BC}$, and $\Delta I_{CA}$ of motor 100 are modelled on an ideal motor having no saliency, winding magnetomotive force (MMF) space harmonics, or core signal losses that affect the characteristics of $\Delta I_{AB}$, $\Delta I_{BC}$, and $\Delta I_{CA}$. Referring to FIG. 4, an ideal saturation vector behaviour of $\Delta I_{AB}$ (ideal behaviour curve 416), $\Delta I_{BC}$ (ideal behaviour curve 418) and $\Delta I_{CA}$ (ideal behaviour curve 414) is shown as rotor 114 makes a complete rotation around Sectors 0-5 of space 200. Taking the angular midpoint of Sector 0 as the reference position of 0 degrees for rotor 114, the assumed idealized behaviour of $\Delta I_{AB}$, $\Delta I_{BC}$, and $\Delta I_{CA}$ is shown as rotor 114 is moved to different angular positions from the reference position of 0 degrees into different Sectors, as shown.

For the embodiment, $\Delta I_{AB}$, $\Delta I_{BC}$, and $\Delta I_{CA}$ behaviour of motor 100 is modelled against the ideal characteristics shown in FIG. 4. As such, the position of rotor 114 measurements of $I_{peakAB+}$; $I_{peakAB-}$; $I_{peakBC+}$; $I_{peakBC-}$ $I_{peakCA+}$; $I_{peakCA-}$ are used to derive saturation vectors $\Delta I_{AB}$, $\Delta I_{BC}$, and $\Delta I_{CA}$. From these saturation vectors, the position of rotor 114 may be determined in one embodiment by locating the position along the x-axis of FIG. 4 where the derived $\Delta I_{AB}$, $\Delta I_{BC}$, and $\Delta I_{CA}$ values best match that of behaviour curves 414, 416 and 418, which position corresponds to a Sector of space 200 in which rotor 114 currently resides. This is possible in situations where, in addition to the saturation behaviour being ideal, that the peaks of the saturation vectors are also known in advance. In other embodiments, mathematical equations can be used based on the present vector values and an equation for the ideal saturation vector to determine the position of the rotor.

For the embodiment, a correction factor is also added to each of the delta values $\Delta I_{AB}$, $\Delta I_{BC}$, and $\Delta I_{CA}$ to ensure that the measured triplets are zero sum triplets. This is done to remove offsets in the measured values that may have been introduced. Such offsets may be caused by errors in the measuring circuitry. This provides a closer comparison to the idealized values, as this has no offset. For the measured values, distortions and offsets may be assumed to have arisen from positive or negative sequence harmonics and not zero sequence harmonics.

For the embodiment, a transformation of the measured values may be done by reducing the saturation vectors $\Delta I_{AB}$, $\Delta I_{BC}$, and $\Delta I_{CA}$ to two derived vectors, Vx and Vy. For instance, the values of $\Delta I_{AB}$, $\Delta I_{BC}$, and $\Delta I_{CA}$ are transformed into these two dimensional vector as follows:

$$Vx = \Delta I_{AB}$$

$$Vy = \left(\frac{\sqrt{3}}{3}\right)(\Delta I_{CA} - \Delta I_{BC})$$

or $$\begin{vmatrix} Vx \\ Vy \end{vmatrix} = \begin{vmatrix} 1 & 0 & 0 \\ 0 & -\frac{\sqrt{3}}{3} & \frac{\sqrt{3}}{3} \end{vmatrix} \times \begin{vmatrix} \Delta I_{AB} \\ \Delta I_{BC} \\ \Delta I_{CA} \end{vmatrix}$$

Figure 5:
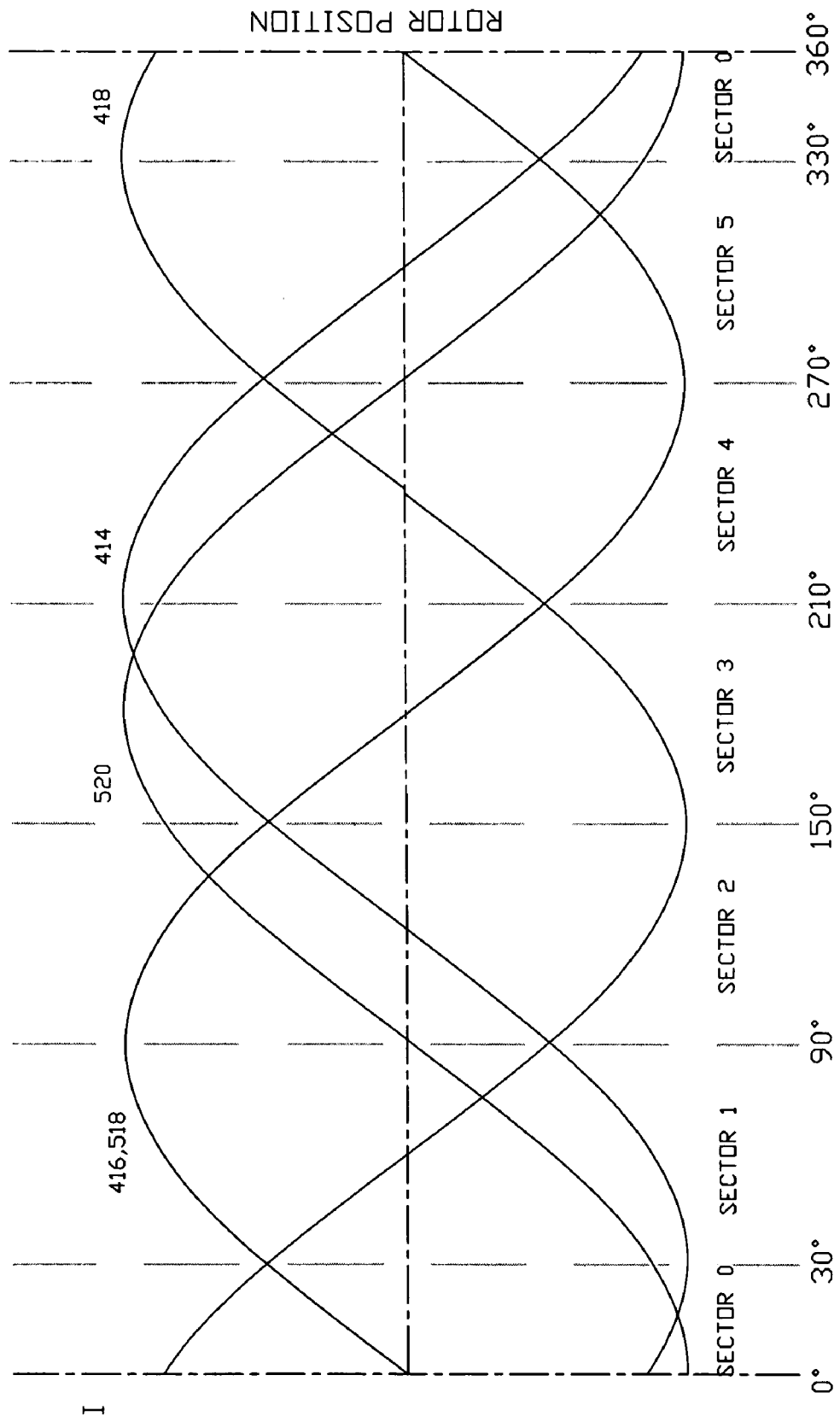
FIG. 5 is a graphical representation of behaviour of two derived values in relation to the saturation vector behaviour shown in FIG. 4.

Since the values Vx and Vy are the ordered pair for the triplet values $\Delta I_{AB}$, $\Delta I_{BC}$, and $\Delta I_{CA}$, notional idealized values of Vx and Vy may also be plotted for each position of rotor 114 over space 200, as shown in FIG. 5. Referring to FIG. 5, the ideal behaviour curves 414, 416 and 418 are also shown, but now with idealized Vx behaviour curve 518 (which corresponds exactly to ideal behaviour curve 416 based on the above transform) and idealized Vy behaviour curve 520 also shown.

With the ordered pair of values Vx and Vy, the estimated position, or θ, may be determined by solving for θ as follows:

$$\theta = \tan^{-1}\frac{Vx}{-Vy}$$

This resolution of θ allows a determination of the position of rotor 114 within a Sector of space 200:

| Value of θ | Sector of Space 200 in which Rotor 114 Resides |
|---|---|
| 330 to 360 and 0 to 30 degrees | Sector 0 |
| 30 to 90 degrees | Sector 1 |
| 90 to 150 degrees | Sector 2 |
| 150 to 210 degrees | Sector 3 |
| 210 to 270 degrees | Sector 4 |
| 270 to 330 degrees | Sector 5 |

It will be appreciated from the above that θ may fall on or very near the boundary between sectors, such as at 30, 90, 150, 210, 270 and 330 degrees. In such a situation where rotor 114 is on the boundary between two Sectors, it becomes a "don't care" situation for the embodiment, since the commutation of windings corresponding to either sector in the commutation scheme would produce the same result (i.e., torque) in starting motor 100. In this situation and for the purposes of starting motor 100, a "coin-toss" logic may be used to resolve which of two Sectors rotor 114 resides in, and consequently, which commutation state is to be selected.

In an alternate embodiment, determining where rotor 114 resides within space 200 may also be performed by mapping the three vectors, providing a three-dimensional view of the angular value, into a two-dimensional representation, then using the two-dimensional representation as an error vector, which can be graphically interpreted by selecting the midpoint angular value of each sector (i.e., angle 0 for Sector 0, angle 60 for Sector 1, angle 120 for Sector 2, angle 180 for Sector 3, angle 240 for Sector 4, and angle 300 for Sector 5), and obtaining the mean square root error between the magnitude of the ideal midpoint vector at each midpoint angular value with respect to the measured vector. For instance, the following relations may be exploited:

$$Vmag = \sqrt{Vx^2 + Vy^2}$$

$$\sin(\theta) = \frac{Vx}{\sqrt{Vx^2 + Vy^2}}$$

$$\cos(\theta) = \frac{-Vy}{\sqrt{Vx^2 + Vy^2}}$$

In the above equations, Vmag represents the magnitude of the Vx and Vy vectors, and θ represents the angular value at which Vmag appears. Since Vmag (as represented by Vx and Vy over a Cartesian space) is constant when it is superimposed over space 200, the square of the magnitude of an error vector corresponding to one of six Cartesian vectors at 0, 60, 120, 180, 240 and 300 degrees with respect to Vmag may be evaluated as follows:

$$\text{ErrorVector}_{mag}^2 = 2(1 - \cos(|\theta - \beta|))$$

where β is set at 0, 60, 120, 180, 240 and 300 degrees respectively for the midpoints of each of Sectors 0, 1, 2, 3, 4 and 5.

Figure 6A:
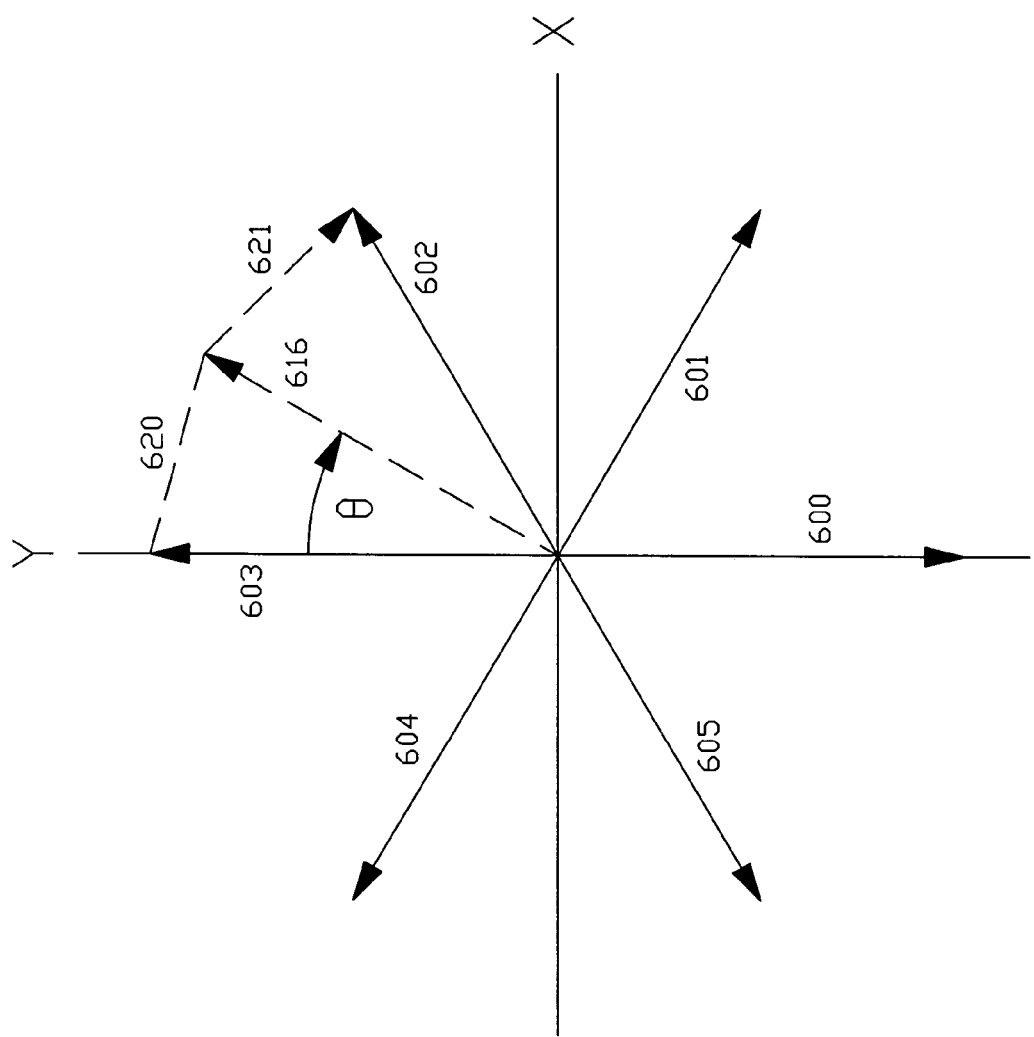
FIG. 6a is a graphical representation of a vector space occupied by the two derived values of FIG. 5.
Figure 6B:
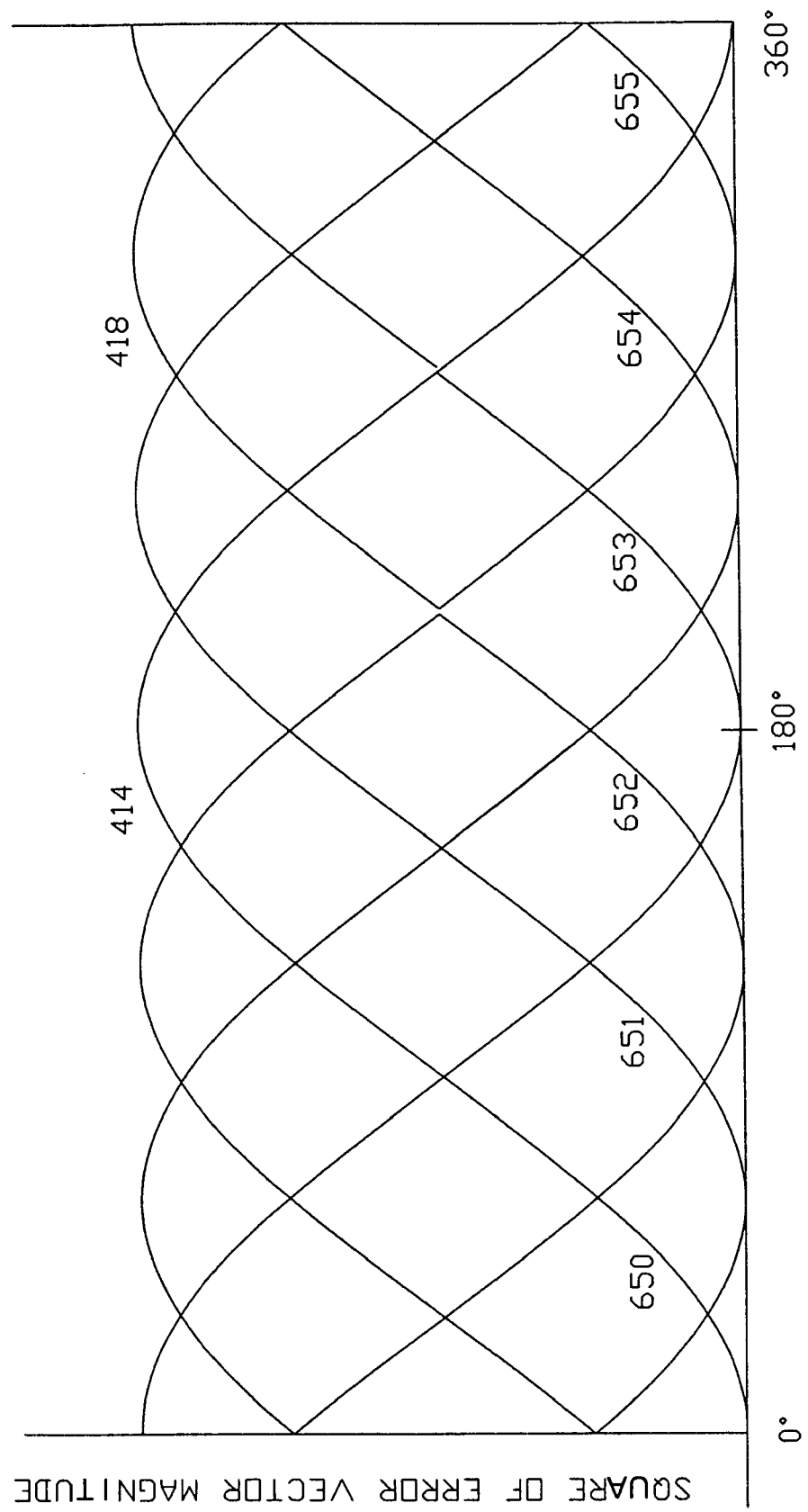
FIG. 6b is a graphical representation of error vector magnitudes associated with the two derived values of FIG. 5.

Referring to FIG. 6a, the above determination for ErrorVector$_{mag}^2$ may be shown graphically. Therein, the midpoint vectors for each of Sectors 0, 1, 2, 3, 4 and 5 are respectively shown as 600, 601, 602, 603, 604 and 605. If a notional vector 616 having Vmag at angle θ is plotted as well, then with respect to each of vectors 600, 601, 602, 603, 604 and 605, an isosceles triangle is formed with vector 616. For the exemplary vector 616 shown on FIG. 6a, an error vector 618 is will exist with respect to vector 600 corresponding to the midpoint of Sector 0, and another error vector 621 corresponding to midpoint vector 601 of Sector 1. It will be appreciated that an error vector may be plotted against each midpoint vector 600, 601, 602, 603, 604 and 605. It will be also appreciated that for each such error vector, the magnitude of the vector will increase as θ moves to a value 180 degrees removed from the β (or midpoint) value of the midpoint vector for a Sector, and decrease as θ moves to a value 0 or 360 degrees from β. For each midpoint vector 600, 601, 602, 603, 604 and 605, the square of the magnitude of an error vector corresponding to the midpoint vector may be shown graphically in FIG. 6b as a function of θ. The waveforms 650, 651, 652, 653, 654, and 655 corresponds to midpoint vectors 600, 601, 602, 603, 604 and 605 respectively.

From this analysis, it can be estimated that the Sector in which rotor 114 resides is the Sector for which the magnitude of the error vector is the smallest. For the embodiment, once θ is determined the square of the magnitude of the error vector for each midpoint vector 600, 601, 602, 603, 604 and 605 may be evaluated. The Sector associated with the midpoint vector for which the square of the magnitude of the error vector is the smallest is then identified as the Sector in which rotor 114 resides. As described above, if there are two midpoint sectors for which the magnitude of the error vector is equal at θ, then this represents a "don't care" condition, and either associated Sector may be selected as the Sector in which rotor 114 resides. For the embodiment, in such a "don't care" situation, on the modelled assumption that if rotor 114 is spinning, the Sector that rotor 114 is about to enter would be selected as the Sector in which rotor 114 is located.

It will be appreciated that in alternate embodiments, other methods for analyzing $\Delta I_{AB}$, $\Delta I_{BC}$, and $\Delta I_{CA}$ values may be used to estimate the position of rotor 114, including transforming the triplet of values into other values, which may provide performance advantages in certain digital signal processing applications as compared to solving for θ directly.

Figure 7:
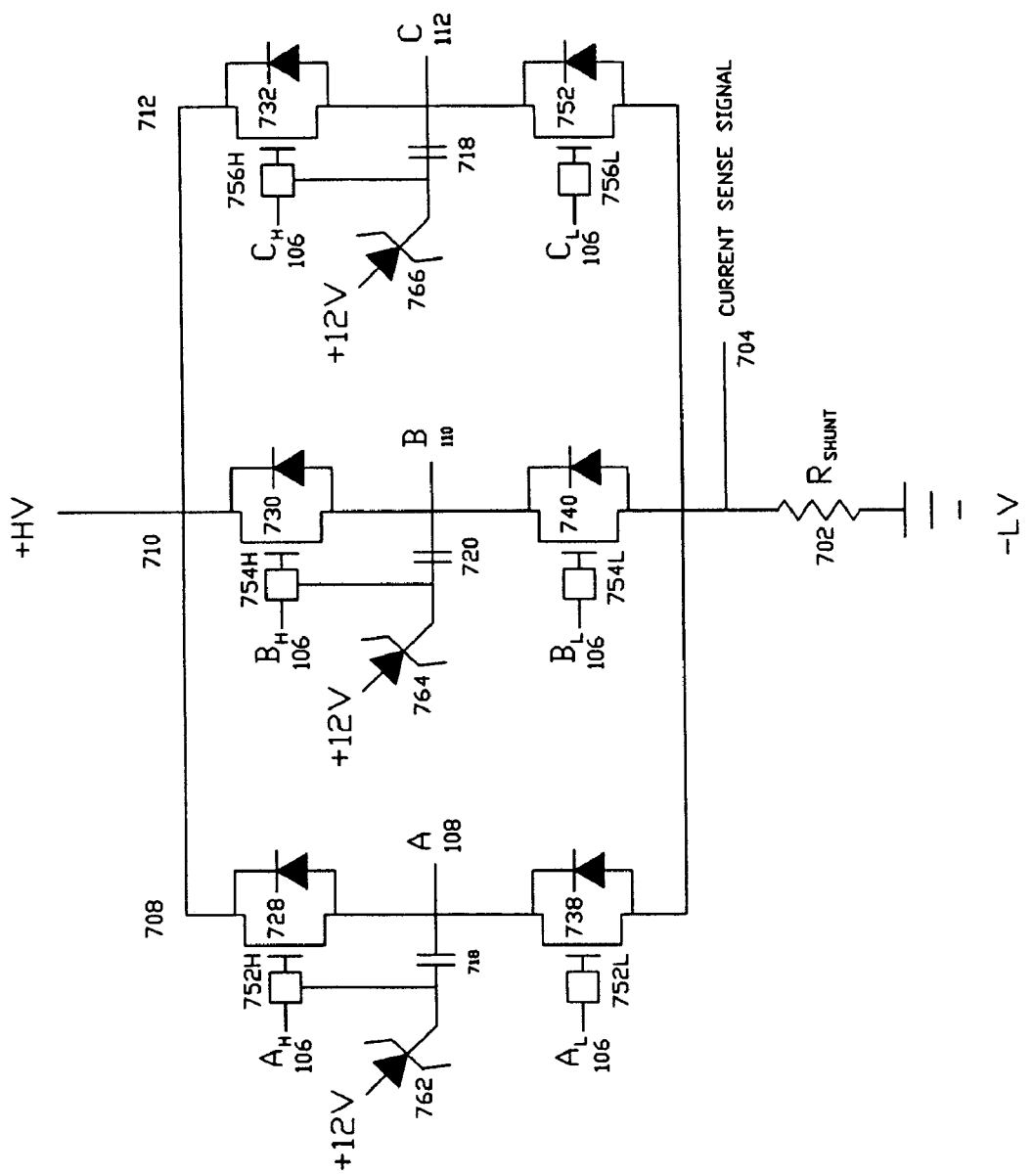
FIG. 7 is a schematic diagram of an inverter bridge of the control circuitry of FIG. 1.

For the embodiment, the six peak current values for phases A, B, and C of motor 100 are detected by sense circuitry, such as a sense resistor, and the measurements are processed by a digital signal processing (DSP) system. Referring to FIG. 7, there is provided a schematic of 3-phase inverter bridge 102 with sense circuitry connected to phases A, B and C to detect the six peak current values in each phase pair circuit path: $I_{peakAB+}$; $I_{peakAB-}$; $I_{peakBC+}$; $I_{peakBC-}$; $I_{peakCA+}$; $I_{peakCA-}$. As shown in FIG. 7, a sense resistor 702 is used to detect the peak current values as current pulses are passed through circuit paths between phase pairs AB, BC, and CA. From lead wire 704, a current sense signal may be observed that correspond to $I_{peakAB+}$; $I_{peakAB-}$; $I_{peakBC+}$; $I_{peakBC-}$; $I_{peakCA+}$; $I_{peakCA-}$. As shown in FIG. 7, each of the inverter bridges legs 708, 710 and 712 for phases A, B and C respectively comprise a pair of MOSFETs, each pair of which having one MOSFET for driving the current to the power bus 108, 110 or 112 associated to the phase to a high, or positive value, and another MOSFET for driving the current to a low, or negative value. Each gate of the MOSFETs are connected to a PWM signal of signals 106 provided by motor driver and controller 104 through integrated-circuit (IC) drive circuits 752H, 752L, 754H, 754L, 756H and 756L. It will be appreciated that IC drive circuits 752H, 752L, 754H, 754L, 756H and 756L provide level-shifting of PWM signals 106 to voltage levels that is capable of driving the gates of the MOSFETs of legs 708, 710 and 712.

Figure 8:
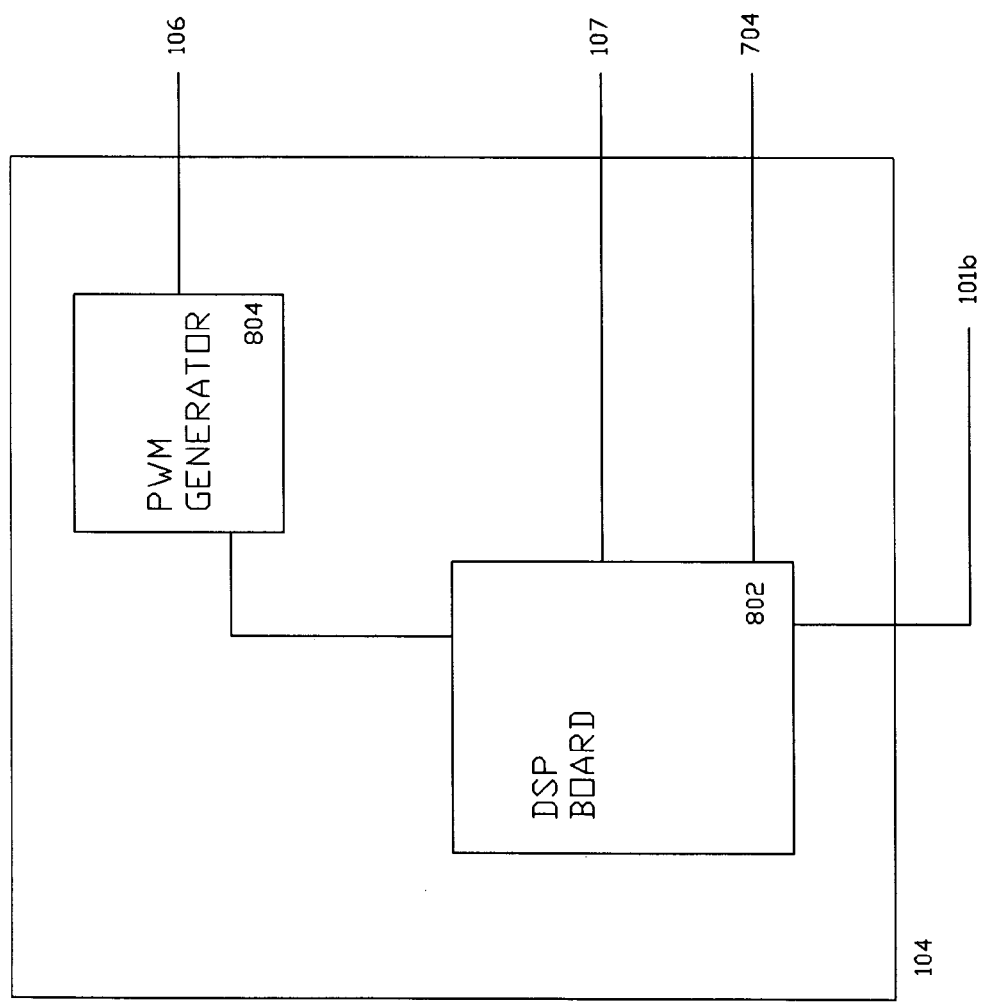
FIG. 8 is a block diagram of a digital signal processor board of the control circuitry of FIG. 1.

The above method for determining the position of rotor 114 may be implemented in hardware, software, or a combination thereof using programming and circuit design techniques know in the art. For the embodiment, the determination of the position of rotor 114 is conducted by motor control circuits 120. Referring to FIGS. 1 and 8, circuits 120 includes motor driver and controller 104. Therein, a DSP board 802 is included to provide the analysis and mathematical calculation described above to estimate the position of rotor 114, and to provide the position to motor controller 104 to control the PWM signals 106 which sets the commutation of motor 100 from PWM generator 804. The DSP logic that may be used to implement the above described calculations are well know to a person of skill in this art, and is not described further herein. It will be apparent to a person of skill in this art that other combinations of electronic and software logic may be used in alternate embodiments to implement a system to perform the analysis to determine the position of rotor 114 as described above.

As described above, the embodiments make calculations on a motor 100 which will saturate and exhibit nearly ideal saturation behaviour characteristics. Since not every motor will exhibit such characteristics, motor 100 is preferably composed of isotropic materials whose properties are independent of the orientation of magnetic flux. For motor 100 built with isotropic materials, measurement of $I_{peakAB+}$; $I_{peakAB-}$; $I_{peakBC+}$; $I_{peakBC-}$ $I_{peakCA+}$; $I_{peakCA-}$ is prefaced by an injection of a pulse along a direction of each pair of phases AB, BC or CA. For the embodiment, the magnitude of the pulse is set to the value of the continuous load rating of motor 100, and the pulse length is set to at least the time required for the windings of a phase pair to reach the continuous load rating. For most applications, the pulse time may be 50 to 100 microseconds. It will be appreciated that although each pulse will generate a magnetic field that acts upon rotor 114, the actual power generated by each pulse is so small compared to a typical load of motor 100 such that rotor 114 will typically only twitch and will not actually rotate in response to the pulses. Furthermore, if reverse direction pulses are sent to phase pairs of motor 100 in immediate succession, any potential movement of rotor 114 due to a pulse in a first direction will be immediately cancelled by a pulse in the reverse direction.

Signals used to indicate a change in inductance of motor 100 during saturation can be made more reliable by having DSP board 802 configured to reject Vmag values that are below a threshold level. For instance, if a determined Vmag value is too low, then the measurements of $I_{peakAB+}$; $I_{peakAB-}$; $I_{peakBC+}$; $I_{peakBC-}$; $I_{peakCA+}$; and $I_{peakCA-}$ may be considered unreliable, and the process started again with new measurements of $I_{peakAB+}$; $I_{peakAB-}$; $I_{peakBC+}$; $I_{peakBC-}$; $I_{peakCA+}$; and $I_{peakCA-}$, but with increased magnitude of pulse current being provided to each phase pair so as to ultimately provide a greater Vmag value above a particular threshold level, which would tend to provide greater reliability for measuring a change in inductance due to the position of rotor 114.

In the above-described embodiments, the position of rotor 114 may be detected even while rotor 114 is in motion, so long as the speed of rotation is small enough that back electromotive force (EMF) does not affect the $I_{peakAB+}$; $I_{peakAB-}$; $I_{peakBC+}$; $I_{peakBC-}$ $I_{peakCA+}$; $I_{peakCA-}$ measurements. It will be appreciated that as speeds climb above a threshold at which back EMF becomes a factor, other methods for determining rotor position may be implemented, such as a method that estimates the rotor position from back electromotive force readings.

In the embodiment, during motor startup the initial position of rotor 114 is estimated so that the starting torque may be optimized by energizing the appropriate windings of motor 100, as described above. It will be appreciated that this relieves the need to initially apply a large starting, or inrush, current to motor 100 to start rotor 114 when the position of rotor 114 is unknown initially. For the embodiment, the starting current for motor 100 may be substantially lower than for a similar motor without rotor position estimation. In the embodiment, after the initial position of rotor 114 is detected, a controlled amount of current is applied to the two appropriate windings of motor 100 in order to start rotation of rotor 114 so that the back EMF rises to a level that may be utilized for further rotor 114 position estimations, as is known to one of skill in this art. This level of back EMF may typically be achieved within rotation of one Sector of space 200.

Post-Commutation Back EMF Detection

In an embodiment, during a six-step commutation scheme as described above with reference to FIG. 3, back electromotive force (back EMF) may be detected as rotor 114 rotates past a particular speed after which back EMF measurements may be accurately made. Until that time, rotor 114 position determinations may be made with the current pulse and analysis, as described above. The detected back EMF may be used to adjust control signals for in a variety of applications, such as position detection of rotor 114 in motor 100 during higher speed operation.

Figure 9:
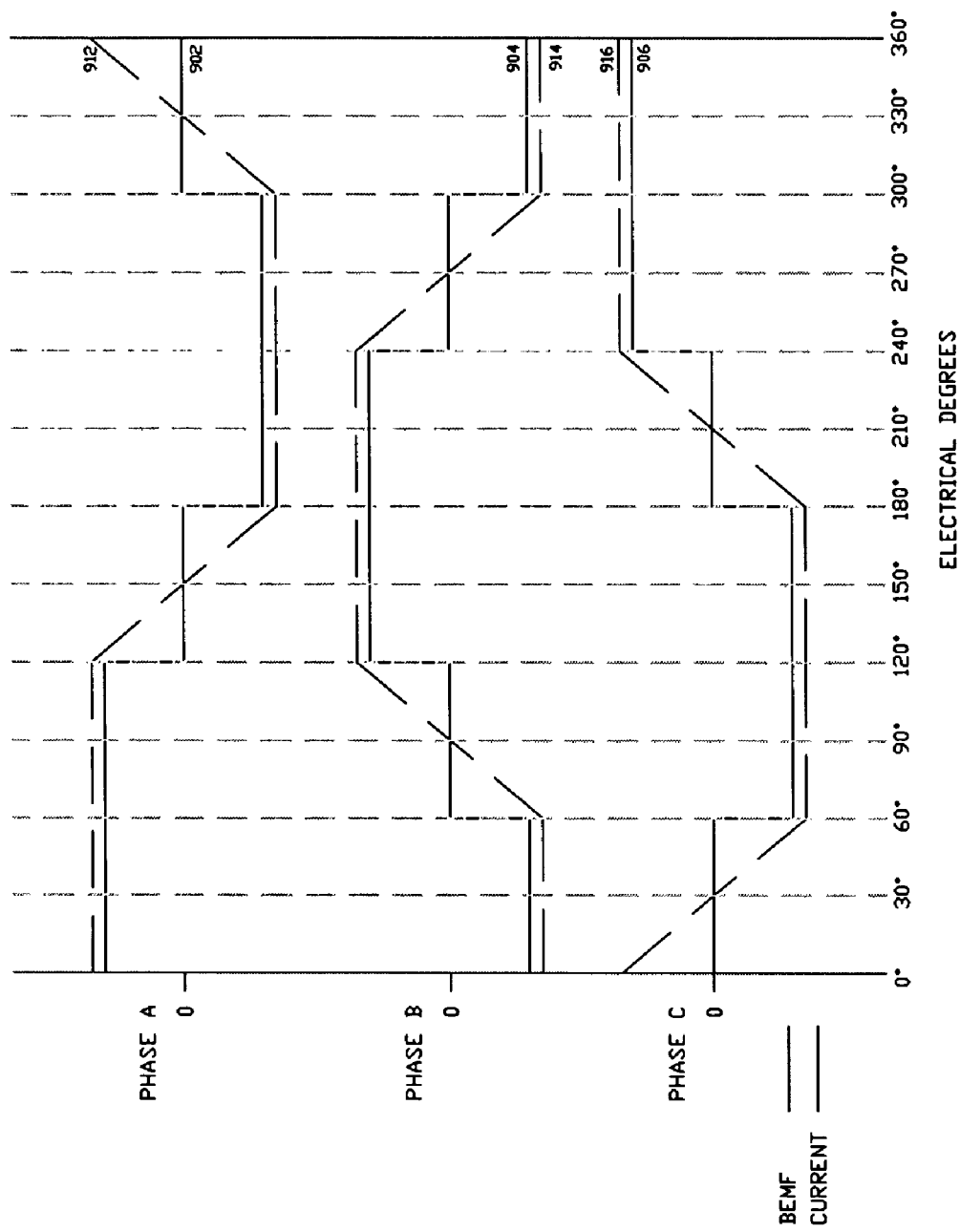
FIG. 9 is a graphical representation of the commutation states of FIG. 3.

FIG. 9 shows a pulse width modulation (PWM) commutation scheme based on the position of rotor 114 described above. For instance, while rotor 114 is between 0 and 60 degrees, phase A of motor 100 is on with a positive voltage, phase B is also on with a negative voltage, and phase C is floating as it is off. As rotor 114 moves into the next Sector between 60 and 120 degrees, phase A is still on, but phase B has gone into floating state as it is turned off, and phase C is turned on with a negative voltage. The PWM commutation shown in FIG. 9 is referred to trapezoidal commutation, with PWM waveform 902 corresponding to phase A, waveform 904 corresponding to phase B and waveform 906 corresponding to phase C.

Still referring to FIG. 9, an idealized, or modelled, back EMF that may be detected for an ideal model motor across each of phases A, B and C are shown respectively as back EMF waveforms 912, 914 and 916. It will be appreciated that idealized back EMF waveforms 912, 914 and 916 for each phase generally follows the shape of PWM waveforms 902, 904 and 906, and so for the present embodiment back EMF waveforms 912, 914 and 916 are also trapezoidal in shape. As is known to a person of skill in this art, various circuits and methods may be devised to measure the back EMF on each phase, and to interpret the readings to obtain information about motor 100.

In other embodiments the back EMF waveforms may also be sinusoidal in nature. However, it will be appreciated that even with sinusoidal back EMF wave shapes, the various techniques describe herein with respect to trapezoidal zero-crossing commutation may still be used. Some shapes may introduce small amounts of torque ripple in some embodiments.

Three-phase inverter bridge 102 and motor driver and controller 104 presents a body diode to motor 100 as MOSFETs of inverter bridge 102 switch between phases as a phase is turned off and another is turned on. For example, if motor 100 transitions from commutation state (1) to state (2) as described above with reference to FIG. 3, phase C of motor 100 will turn off, and phase B will turn on at the transition point. However, as the transition is not instantaneous, and a transition period of time passes before phase B is completely turned off, and the current in phase C rises to the current that was flowing through phase B. In this example, as the current is turned off in phase B, a free-wheeling current is left upon winding 110 of phase B that flows back through the body diodes of MOSFETs 710 of inverter bridge 102. As the current is switched from phase B to phase C during the transition, the MOSFETs 710 of circuit 102 relating to phase B will present a body diode that allows the free-wheeling current to flow back to the high or low power rail and cause a disruption in the observed back EMF relating to motor 100.

Body diodes of circuits 102 and 104 introduce a noise effect on the back EMF observed on motor 100. This non-instantaneous switching as commutation state changes can create erratic voltage and current signals to be imported into the phases of motor 100 since the voltage and current conditions during this period do not result solely from the effect of the motion of rotor 114.

Figure 10:
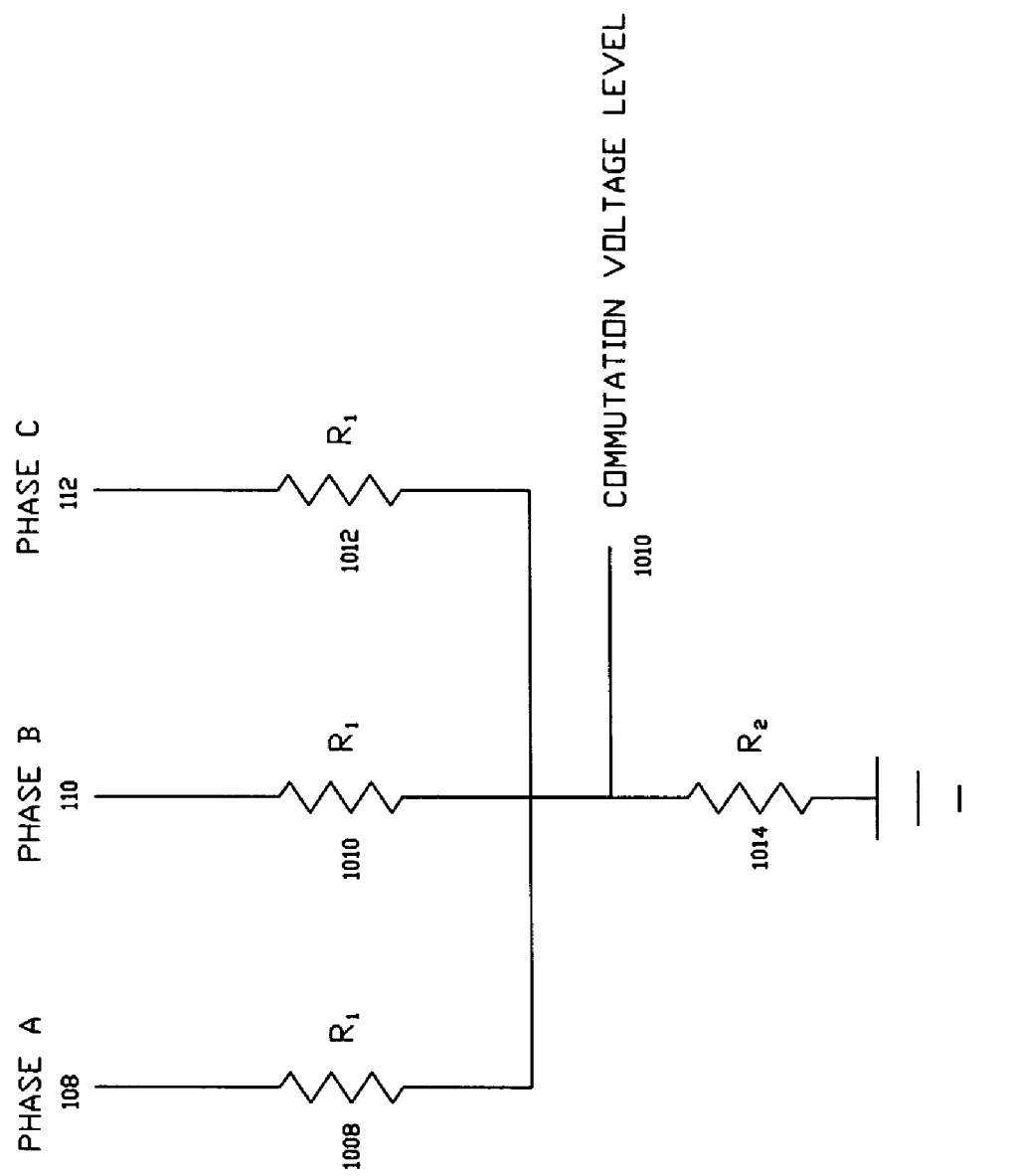
FIG. 10 is a schematic diagram of an averaging circuit of the control circuitry of FIG. 1.

An embodiment provides a system and method for detecting the period of transition as commutation states change so that back EMF readings from the windings during the period of transition may be ignored. For the embodiment, a commutation voltage detection circuit 116 is connected to the windings 108, 100 and 112 of motor 100. Referring to FIGS. 1 and 10, further details of circuit 116 are provided. In FIG. 10, an averaging circuit 1000 of circuit 116 is shown. Circuit 1000 is connected to each phase of motor 100, i.e., to windings 108, 110 and 112 corresponding to phases A, B and C respectively. Windings 108, 110 and 112 are connected through sense circuitry to allow detection of back EMF. For the embodiment, windings 108, 110 and 112 are connected through a resistor R1 (shown as 1008, 1010 and 1012 respectively), and which are collectively connected serially through resistor R2 (shown as 1014). A lead connection 1016 is provided to allow a reading of the average commutation voltage level over the three phases A, B and C. R1 and R2 are chosen so as to provide a voltage reading at lead connection 1016 that is within a range that DSP board 802 may receive and process. The average commutation signal observed at lead connection 1016 may be used to provide back EMF information, and for the embodiment, also information regarding when the observed back EMF is unreliable.

Figure 11A:
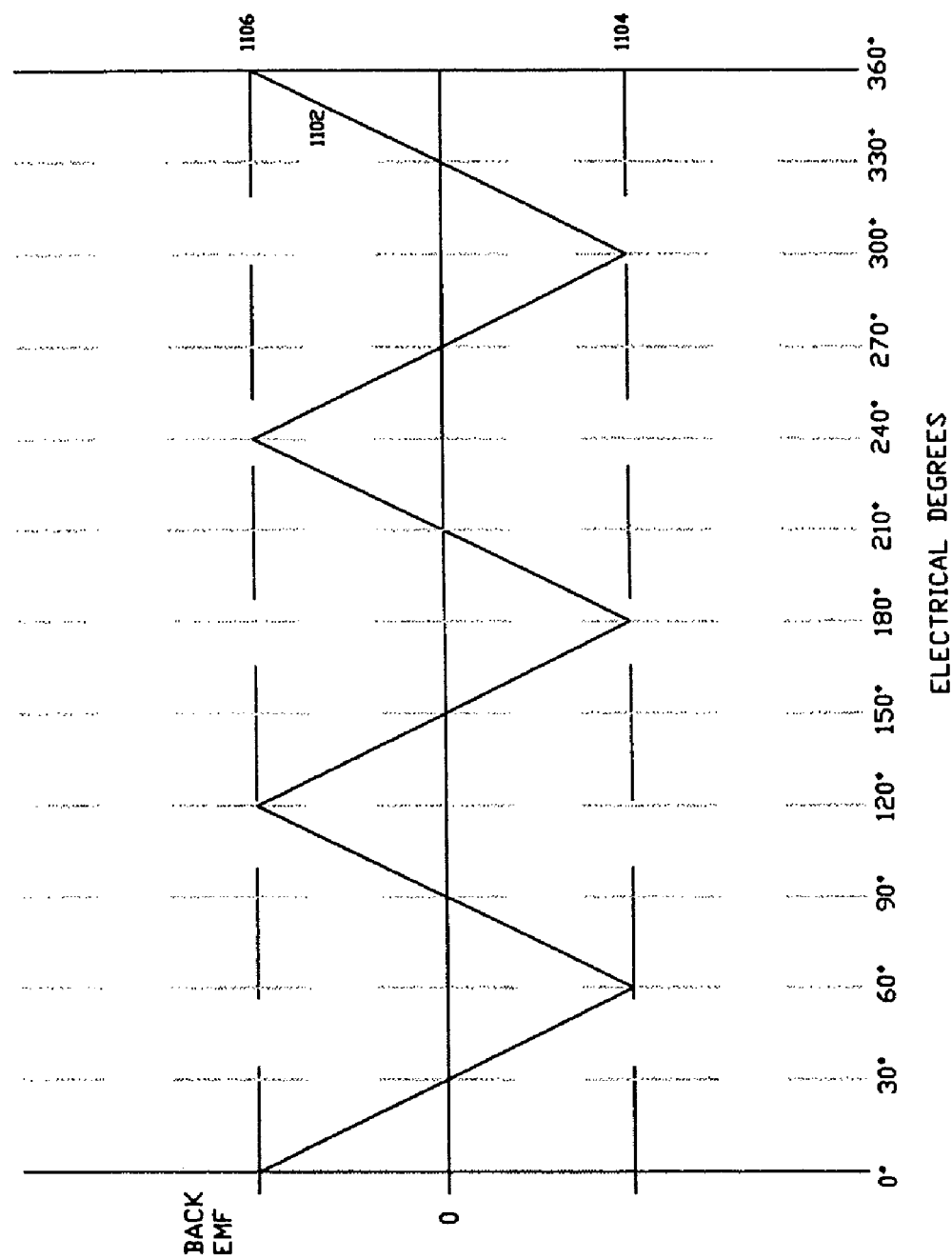
FIG. 11a is a graphical representation of an idealized, modelled voltage waveform that may theoretically be sensed by the averaging circuit of FIG. 10.

Referring to FIG. 11a, a situation involving an ideal motor with ideal commutation is considered. In the ideal motor, if the idealized back EMF waveforms 912, 914 and 916 of FIG. 9 are superimposed on one another (i.e., averaged), the idealized averaged back EMF waveform 1102 as shown is produced. The average back EMF waveform 1102 is a triangular wave that is centered around zero volts. Because waveform 1102 is idealized, at points of Sector transition (i.e., where commutation states change) the peaks of waveform 1102 are perfect triangular peaks, since for idealized motor commutation the transition period between commutation states is zero and the change in commutation states occurs instantly. As shown, waveform 1102 has a lower end voltage 1104 and an upper end voltage 1106.

Figure 11B:
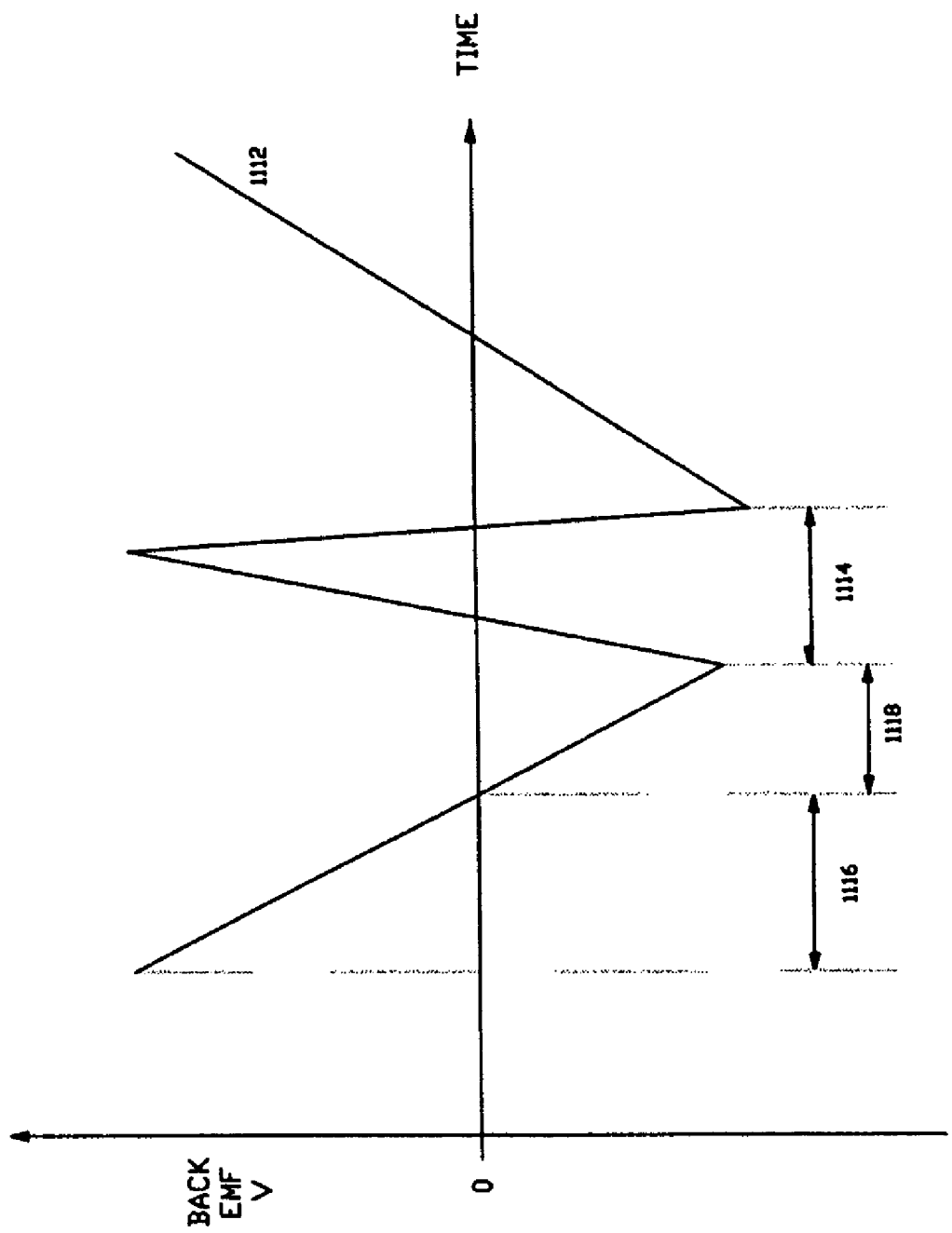
FIG. 11b is a graphical representation of a notional waveform that may actually be sensed by the averaging circuit of FIG. 10.

However, for non-ideal motor 100, the peaks of its average back EMF waveforms are not perfectly formed triangular peaks, but instead, in the period of transition between commutation states, a characteristic spike or pulse is produced as the free-wheeling current in the phase that just turned off discharges from the winding. Referring to FIG. 11b, the voltage readings at lead connection 106 is shown for a notional transition of commutation states. In FIG. 11b, there is shown a notional waveform 1112 for a single notional transition from an odd Sector (such as Sector 1 of space 200) in which the back EMF was falling to a even Sector in which back EMF is rising (such as Sector 2). For the embodiment, it will be appreciated that for a notional waveform, the back EMF will be falling in odd numbered Sectors (such as Sectors 1, 3 and 5) and be rising in even numbered Sectors (such as Sectors 0, 2 and 4). Additionally, for the embodiment, the position of rotor 114 is generally known, either from the position estimated method described above or by other methods known in the art, and as such DSP board 802 may be apprised of whether rotor 114 is in an odd or even Sector.

As seen from waveform 1112, the average commutation voltage observed at lead connection 1016 does not provide a single monotonic transition peak, but rather spikes upwards sharply during the transition period 1114 before returning to a wave shape that resembles the ideal waveform 1102 seen in FIG. 11a. The section of waveform 1112 during transition period 1114 may be considered a spike having a first foot at the beginning of period 1114 and a second foot at the end of period 1114. It will be appreciated that for a transition from an even Sector to an odd Sector, than waveform 1112 might appear inverted, and its spike would point downwards.

For the embodiment, the observed average commutation level at lead connection 1016 is used to estimate transition period 1114 so that the back EMF observed in motor 100 during the period may be ignored, since the observed back EMF during that period is offset by the effects of the body diodes of circuit 102 and 104. For the embodiment, the end of transition period is also detected so that back EMF measurements may reliably resume after transition period 1114 is over. For the embodiment, observed waveform 1112 for a notional commutation state transition may be broken up into three states for analytical purposes by a state machine: State 2 relating to the period right after commutation where the effects of free wheeling current may to be observed; State 1 relating to the period after the spike in period 1114 is observed; and State 0 relating to the period after the free wheeling current has dissipated and the observed back EMF is reliable again. It will be appreciated that State 0 also immediately precedes State 2 on waveform 1112.

Figure 12:
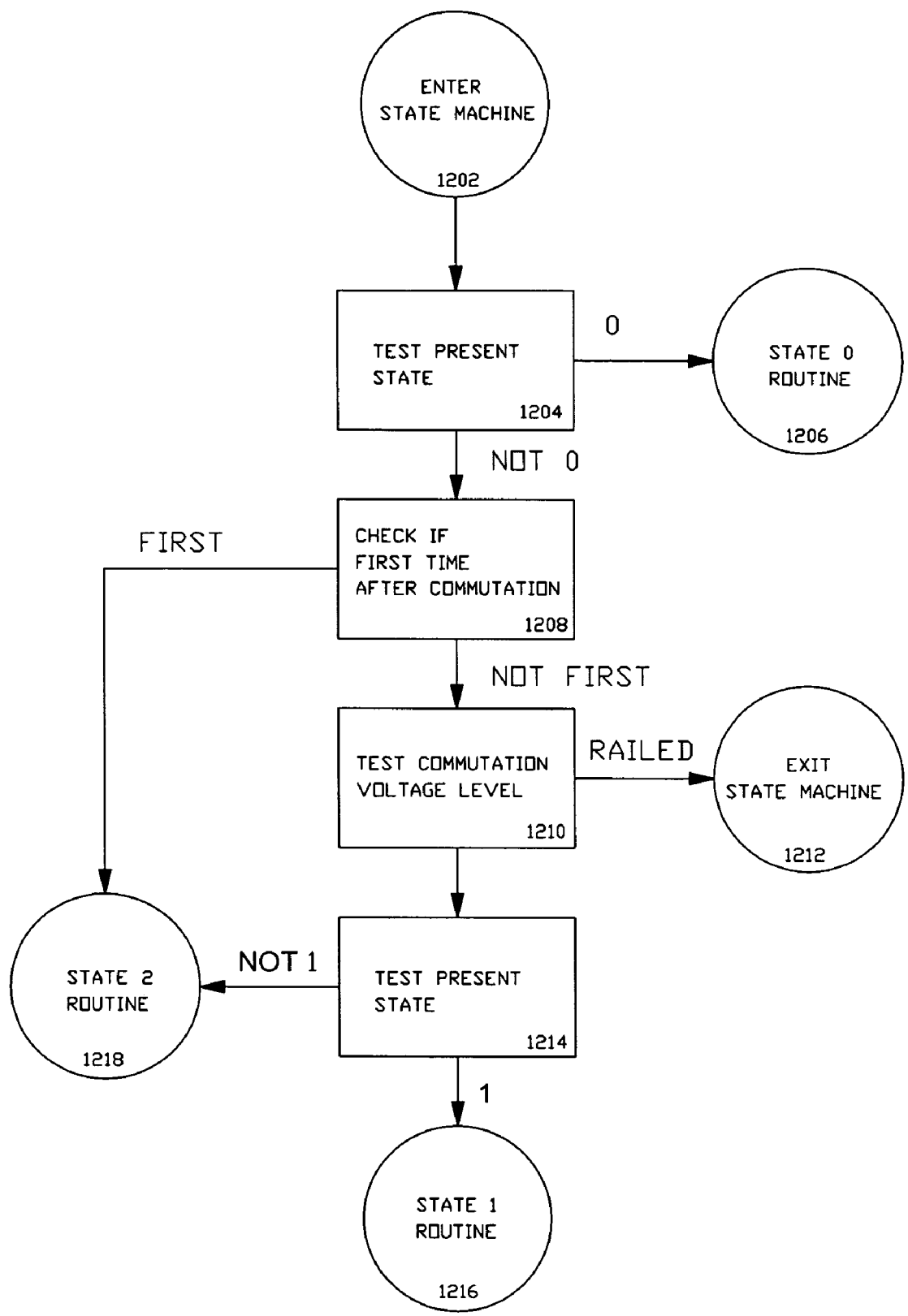
FIG. 12 is a flow chart diagram of a state machine operating on the DSP board of FIG. 8.

The detection of States 2 and 1, and the corresponding "blanking" algorithm to discount back EMF reading during transition period 1114 for a transition from an odd to even Sector is now described with respect to a state machine 1200 shown in FIG. 12. State machine 1200 is implemented for the embodiment as an interrupt routine on DSP board 802 that is executed at intervals, such as at 50 microseconds or other time period that is appropriate for motor 100 given its expected operation speed. At each interrupt, if DSP board 802 identifies a odd to even Sector transition, then state machine 1200 is executed. If an even to odd Sector transition is identified, then another state machine for handing even to odd Sector transition is executed.

Considering for example an odd to even Sector transition, state machine 1200 is entered at step 1202 and a series of steps is performed to determine the present state, so that one of three routines, State 0 routine 1206, State 1 routine 1216 and State 2 routine 1218 is executed, or state machine 1200 is exits at step 1212 without any of routines 1206, 1216 or 1218 operating. State machine 1200 as described is for handling a transition from an odd to even Sector, i.e., from a situation of falling back EMF to rising EMF. A state machine handling a transition from an even Sector to an odd Sector is also provided to DSP board 802 to handle such transitions, and the operation of such a state machine will be apparent to one of skill in this art having regard to the description below relating to state machine 1200, and as such the operation of the even to odd sector state machine is not described in further detail. As described above, DSP board 802 is aware of the current sector that rotor 114 is in, and as such, it can select which state machine to utilize depending on whether the transition is from an odd to even Sector, or from an even to odd Sector.

Referring now to state machine 1200 of FIG. 12, from state machine entry at step 1202, at step 1204 it is determined if the present state of the state machine is zero. If the state machine 1200 is in State 0, then State 0 routine 1206 is executed, as described below. If state machine 1200 is not in State 0, then at step 1208, the states are evaluated to determine if the present interrupt is the first interrupt processed since the last commutation state change. If so, occurs immediately preceding a change to State 2 at the Sector boundaries of space 200, as described above. If it is determined that present interrupt is the first interrupt processed after commutation state change, then step 1218 is taken to execute the State 2 routine 1218. The determination of whether an interrupt processing is the first may be by way of a flag that is reset at each commutation state change, and then set by execution of step 1208.

If at step 1208 it is determined that the present interrupt is after the first interrupt processing after a commutation state change, then step 1210 is optionally taken to test if the commutation voltage level is "railed", i.e., tied to either the "high" or "low" voltages 1102 and 1104. If so, then the noise on the observed back EMF signal at lead connection 1016 may be considered too high for some applications when the commutation voltage is railed. As such step 1212 may be taken to exit state machine 1200 and wait for the next interrupt before examining the signal at lead connection 1016 again. If at step 1210 it is found that the average commutation signal is not railed, then step 1214 is taken to test the present state of the state machine again. If the present state is found to be state 1, then State 1 routine 1216 is executed, and if the present state is found to be state 2, then State 2 routine 1218 is executed.

Figure 13:
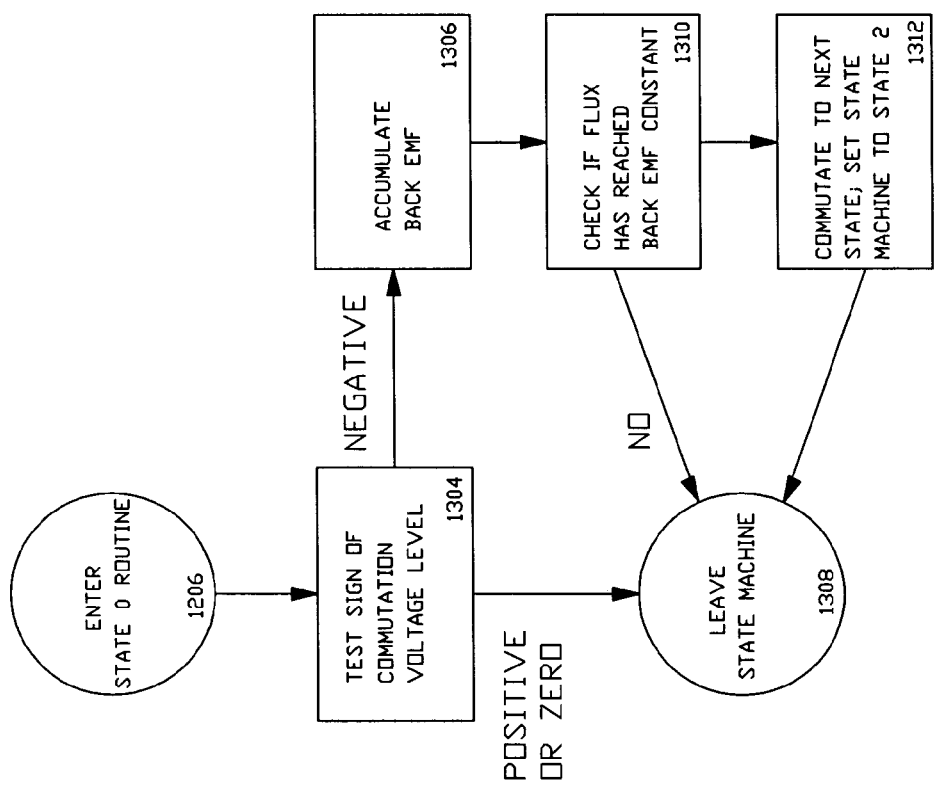
FIG. 13 is a flow chart diagram of a routine of the state machine of FIG. 12.

Referring now to FIG. 13, a flow chart of State 0 routine 1206 is shown for state machine 1200 handling an odd to even Sector transition. After entering State 0 routine 1206, at step 1304 the sign of the back EMF observed at lead connection 1016 is determined. If the back EMF is observed to be positive (i.e., the observed back EMF is along wave 1112 during period 1116 shown in FIG. 11b when it is at or above zero), then step 1308 it taken to exit state machine 1200 operation for this interrupt. However, if the sign of the observed back EMF is negative (i.e., the observed back EMF is below zero during period 1118), then step 1306 is taken to accumulate the observed back EMF in an integration function. It will be appreciated by one of skill in this art that the integration of the back EMF after a zero-crossing will provide the magnetic flux, and that at the moment of ideal commutation at 30 degrees after the zero crossing for the described six-step commutation (i.e., at one of the Sector boundaries described above), the flux would have reached a back EMF constant. It will be appreciated by one of skill in this art that the back EMF constant is a motor constant that is specific to each particular motor, and is typically available from the motor manufacturer on a motor data sheet for the motor. This back EMF constant may also be measured during initial motor set up, as known to one of skill in this art. In step 1310, the accumulated back EMF (i.e., the integrated value of back EMF relating to flux) is compared against the back EMF constant, as appropriately scaled for calculation by DSP board 802. If it is found that the flux has not yet reached the back EMF constant, then step 1308 is taken to leave operation of state machine 1200 for the interrupt. It will be appreciated that as state machine 1200 is executed again on the next interrupt cycle, State 0 routine 1206 will be executed again, and steps 1306 and 1310 taken again, until the flux (or accumulated back EMF reading) has reached the back EMF constant. At step 1310, once the accumulated back EMF, or flux, is found to have reached the back EMF constant, then step 1312 is taken to initiate the commutation state change to the next Sector (an even Sector in this example), and set state machine 1200 to state 2. At step 1312, the time of the commutation is stored as well, so that state machine 1200 can determine the time of the last commutation at a later time. The current commutation voltage reading of lead connection 1016 just observed is latched as well as the last commutation voltage at step 1312. As described above, a flag relating to first interrupt processing after commutation may also be cleared at this time, to indicate that the next interrupt processing will be the first after a commutation state change.

Figure 14:
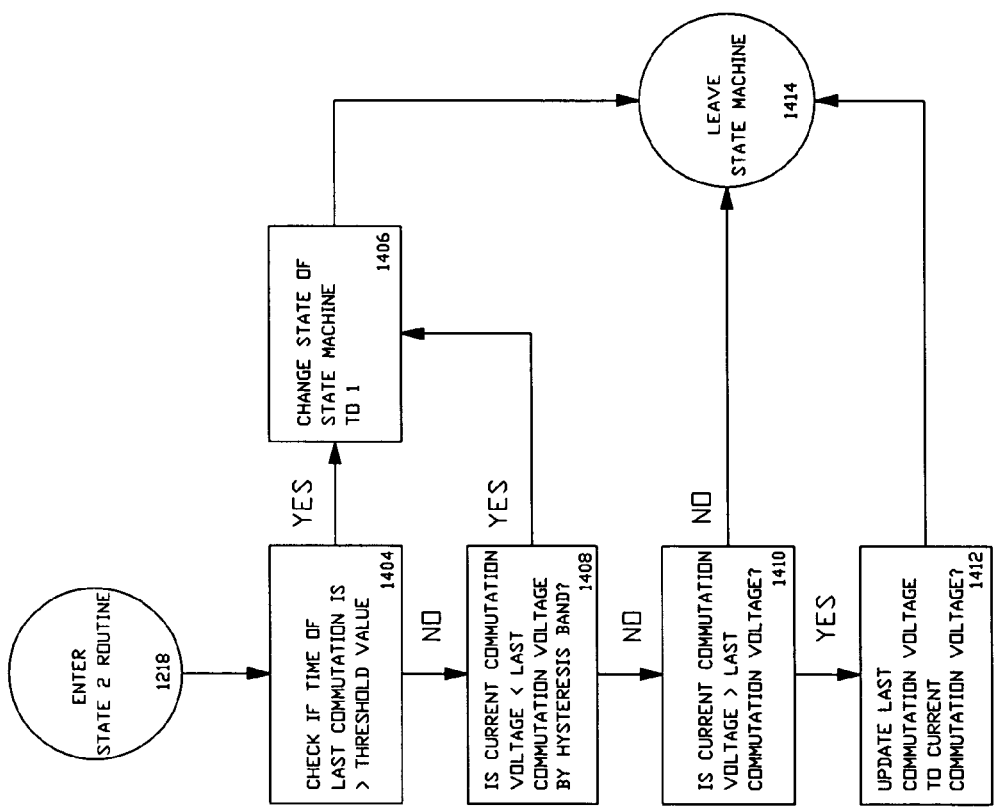
FIG. 14 is a flow chart diagram of another routine of the state machine of FIG. 12.

Referring to FIG. 14, the operation of State 2 routine 1218 is shown. After entry into State 2 routine 1218 at step 1402, at step 1404 the time from the last commutation is checked against a commutation threshold value. If the time is greater than the commutation threshold value, then step 1406 is taken to change the state of state machine 1200 to state 1 and then exit state machine 1200 at step 1414 for this interrupt cycle. The commutation threshold value is chosen so that it represents an estimate of the transition period 1114. As described above, for the embodiment state machine 1200 is executed at a set interval as an interrupt. Since the transition period 1114 for any particular commutation state change has random components, it is possible that certain transition periods 1114 can be shorter than the interrupt interval. For such instances, the transition "pulse" may not be detected by state machine 1200 and the commutation threshold value is selected such that state machine 1200 moves to the next state (i.e., state 1) if after a period of time has elapsed and the below described indication of state change is not observed.

Referring now again to step 1404, if the time of last commutation is shorter than the commutation threshold value, then step 1408 is taken. This step determines if the current commutation voltage observed at lead connection 1016 is lower than the last commutation voltage by at least a hysteresis band. The hysteresis band is an amount of change in voltage which is specious. It is effectively a margin of error for a received signal to account for noise that may appear on the signal. If so, then step 1406 is also taken to change the state of state machine 1200 to state 1. Referring to FIG. 11b, this detection of a current commutation voltage that is less than the last commutation voltage identifies if the current voltage has passed the peak of the commutation pulse in period 1114 and is falling again. The hysteresis band is a value that is chosen to account for random noise that may be observed at lead connection 1016, so that minor fluctuations of voltage will not indicate a state change. The appropriate hysteresis band will vary according to the resolution of the detection equipment used, but generally may be approximately 0.5% of the resolution of the voltage across the entire voltage band of curve 1112 between levels 1102 and 1104.

At step 1408, if the current commutation voltage is determined to be not lower than the last commutation voltage by at least the hysteresis band, then step 1410 is taken to evaluate if the current commutation voltage is greater than the last commutation voltage. If so, then step 1412 is taken and the last commutation voltage is updated to the current commutation voltage before step 1414 is taken to exit processing of by state machine 1200 for the interrupt. Otherwise, if the current commutation voltage is not lower than the last commutation voltage, then step 1414 is taken to exit state machine 1200 without updating the last commutation voltage. It will be appreciated that if the current commutation voltage is lower than the last commutation voltage, but not by a difference greater than the hysteresis band, then state 2 routine 1218 simply ignores that observed voltage at lead connection 1016 as noise and exits state machine 1200 processing for the interrupt.

Figure 15:
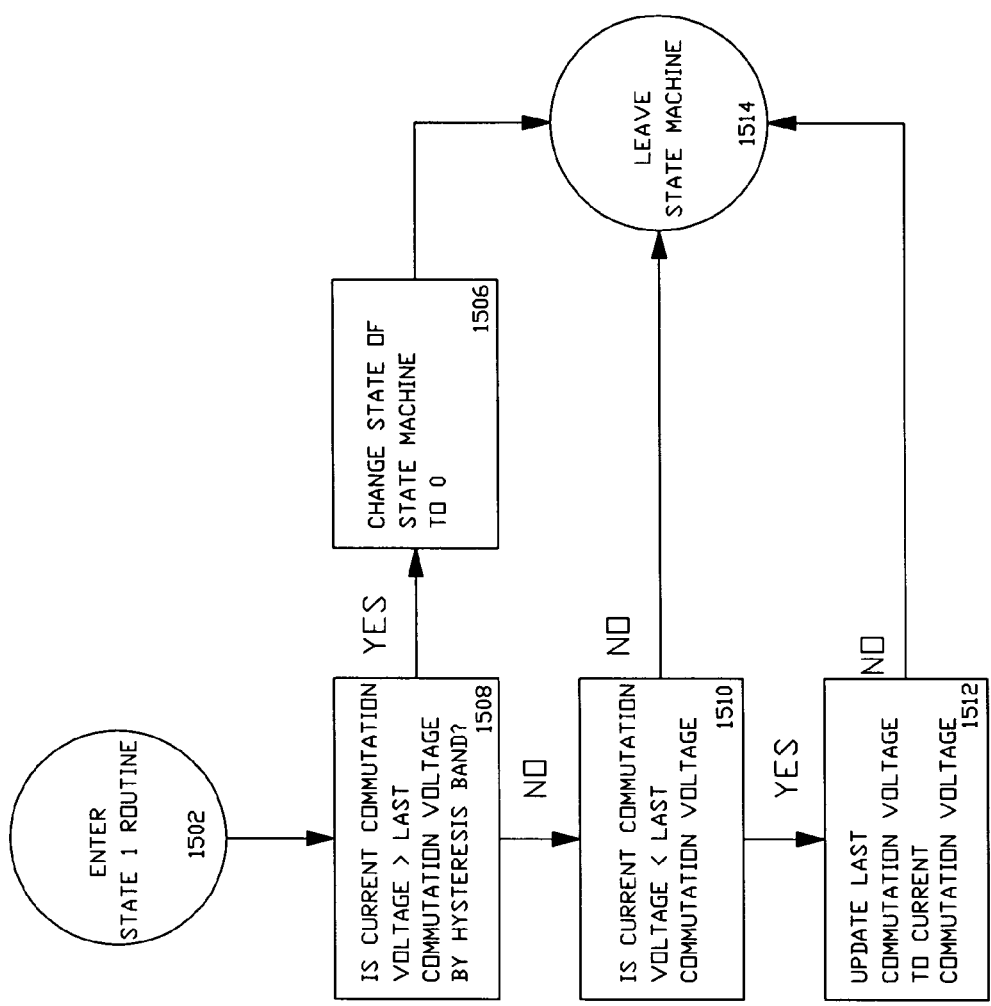
FIG. 15 is a flow chart diagram of yet another routine of the state machine of FIG. 12.

Referring now to FIG. 15, a flow chart of State 1 routine 1216 is shown. After entry into State 1 routine 1216 at step 1502, step 1508 is taken to examine if the current commutation voltage observed at lead connection 1016 is greater than the last commutation voltage by at least the hysteresis band. If so, step 1506 is also taken to change the state of state machine 1200 to state 0. Referring to FIG. 11*b*, detection of a current commutation voltage that is greater than the last commutation voltage identifies the current voltage along curve 1112 which is after the transition period 1114 and in which back EMF may be reliably observed in motor 100 again.

At step 1508, if the current commutation voltage is determined to be not greater than the last commutation voltage by at least the hysteresis band, then step 1510 is taken to evaluate if the current commutation voltage is lesser than the last commutation voltage. If so, then step 1512 is taken and the last commutation voltage is updated to the current commutation voltage, which is greater than the last commutation voltage by at least the hysteresis band, before step 1514 is taken to exit processing of by state machine 1200 for the interrupt. Otherwise, if the current commutation voltage is not greater than the last commutation voltage by at least the hysteresis band, then step 1514 is taken to exit state machine 1200 without updating the last commutation voltage. It will be appreciated that if the current commutation voltage is greater than the last commutation voltage, but not by a difference greater than the hysteresis band, then state 1 routine 1216 simply ignores that observed voltage at lead connection 1016 as noise and exits state machine 1200 processing for the interrupt.

In the embodiment, using state machine 1200 it becomes possible to detect the beginning and end of transition period 1114 (i.e., the beginning of State 2 to the end of State 1) within a resolution of an interrupt period (such as 50 microseconds) so that DSP board 802 can discount the back EMF readings for period 1114, and begin to recognize a reliable observed back EMF when State 0 is achieved after a commutation state change.

From the foregoing description of state machine 1200 for handling odd to even Sector transitions, it will be apparent to one of skill in this art how another state machine for handling even to odd Sector transitions operates.

In an alternative embodiment, the use of an averaging circuit such as shown in FIG. 10 may be avoided by providing back EMF feedback signals directly to a DSP board, which may then performs the following calculation to obtain the commutation voltage Vout:

$$Vout=(Va+Vb+Vc) \times R1/(R1+3*R2)$$

In this way, the state machine operation described above is still performed, although at the beginning of each interrupt cycle a further calculation is first performed to determine the average commutation voltage.

In a still alternative embodiment, sense circuits connected to each of Phases A, B and C may be used to observe the voltage on each phase. In this alternative embodiment, the motor controller using a DSP board similar to board 802 would still track the time at which commutation state change occurs as the beginning a transition period in which back EMF readings are considered unreliable, and the voltage sense circuits on the phase that was turned off in the commutation state change is observed, such as by interrupt processing, until the time when the current flow (i.e., free wheeling current) in that phase is negligible. This time then marks the end of the transition period after which reliable back EMF readings may be obtained again and used by the DSP board.

Phase-Advanced Commutation

When accurate back EMF readings in motor 100 are available, an embodiment allows phase advance of the points of commutation in motor 100. As described above, an optimal commutation time (i.e., the time for changing commutation states) is after the zero-crossing of the back EMF. As is apparent to one of skill in this art, commutating after the zero-crossing of the back EMF of motor 100 provides the most torque-per-ampere of motor current supplied, and therefore allows motor 100 to be controlled efficiently.

There are occasions where phase-advancing of the commutation point is desirable. For instance, phase-advancing the commutation point may be done to spin rotor 114 faster than typically done. This may be useful in battery-powered applications in which achieving a certain rotor speed is critical but the battery terminal voltage may be below its nominal value for a period of time (such as when the battery is running low). Another application may be when maximum voltage is being applied to phase windings 108, 110 and 112 of motor 100, but the desired speed is still not achieved and so DSP board 802 may decide to phase-advance the commutation point to increase motor speed.

To provide phase-advance, state machine 1200 is utilized with its State 2 and State 1 processing. However, for this Routine State 0 processing steps 1306 and 1310 (described and shown with respect to FIG. 13) are replaced with another commutation determination step. That is, the back EMF is not accumulated to see if the integrated value has reached a back EMF constant. Rather, in the new commutation determination step the back EMF voltage corresponding to the phase-advanced commutation point is calculated, and step 1312 of State 0 Routine 1206 of state machine 1200 to commutation to next commutation state is triggered when the measured commutation voltage level reaches the calculated back EMF.

The speed of rotor 114 may be derived from the back EMF of motor 100 or by other means, as known to one of skill in this art. With the speed of rotor 114 and the desired phase-advance angle, the back EMF voltage may be calculated by (i) calculating the rate of change of the back EMF with respect to time, based on the rotational speed and back EMF constant of motor 100, and (ii) determining the phase-advanced voltage prior to zero-crossing at which commutation state change is to occur based on the desired phase advance.

Assume for example that motor 100 is a 4-pole motor, and that a phase advance of 10 degrees (prior to zero-crossing) is desired. Suppose also that rotor 114 is rotating at 2000 rpm in this example, and that the back EMF constant for the 4-pole motor is 0.1 V/rad/s. 2000 rpm is equivalent to 209.4 rad/s mechanically, and for a 4-pole motor, this corresponds to (209.4 rad/s×2)=418.2 rad/s electrically. Multiplying this value by the back EMF constant of 0.1 V/rad/s, the voltage limits for back EMF change at 2000 rpm may be obtained:

Back EMF Constant×Rotational Speed=Voltage Limit for back EMF Change i.e., for this example:

$$0.1 \frac{V}{\text{rad}/s} \times 4.18.8 \text{ rad}/s = 41.88 \text{ V}$$

Figure 16:
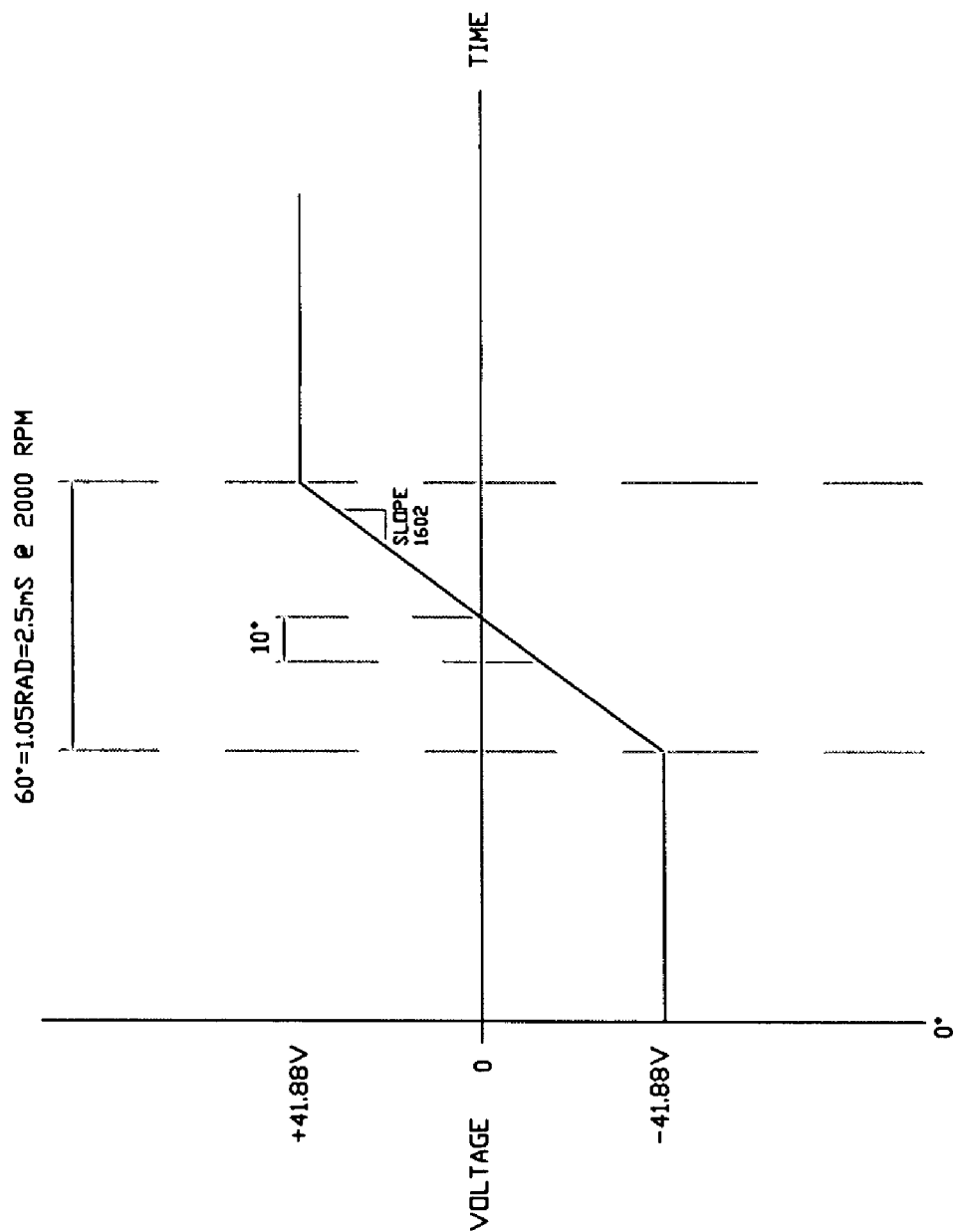
FIG. 16 is a graphical representation of a back electromotive force (EMF) change waveform for the motor of FIG. 1.

Since the entire back EMF change occurs within a Sector of 60 degrees of space 200, the back EMF change may be shown graphically in FIG. 16. It will be appreciated that the 60 degrees over which the change occurs is equivalent to 1.05 rad, which at 2000 rpm is traversed in 2.5 mS. In FIG. 16, it is seen that the back EMF change moves through a slope 1602 over the zero-crossing at a particular speed (2000 rpm in this example) for a particular back EMF constant (0.1 V/rad/s in this example). This slope 1602 may be calculated as:

$$\text{Slope} = \frac{\text{Height}}{\text{Length}} = \frac{(41.88 \text{ V}) \times 2}{2.5 \text{ mS}} = 33497.7 \text{ V}/S$$

With this slope 1602 of the back EMF change determined, it may be determined at what voltage a desired phase-advanced commutation, such as a 10 degree phase-advanced commutation, should occur. Since 10 degrees, or 0.175 rad, requires 0.418 ms to be traversed at 2000 rpm, the phase-advanced voltage for this example is:

Phase Advance Voltage=Slope×Phase
Advance=33497.7 V/S×0.418 mS=14V

For this example, to obtain the 10 degree phase advance DSP board 802 would cause a commutation state change when the commutation voltage level at lead connection 1016 reaches 14V.

For this example, the phase advance was known at 10 degrees relative to the zero-crossing. A known phase advance typically arises in an application in which the torque speed curve for motor 100 is known, and the application knows in advance the amount of advance that is required to produce the desired torque speed. For other applications, the required phase advance may not be known in advance. In such applications, the phase advance desired may be set by a feedback loop that operates with the rotation speed of rotor 114 as feedback, and continually adjust the phase advance angle until the desired rotor 114 speed is achieved. The design and implementation of such as feedback look with DSP board 802 is well known to one of skill in this art, and is not described in further detail.

Rotor Startup Back EMF Detection

In addition to back EMF corruption arising from commutation state changes, back EMF readings are also corrupted during initial startup. As described above, DSP board 802 monitors the back EMF signal from lead connection 1016 for a zero crossing and then subsequently integrates the back EMF reading to determine the proper time to commutate (i.e., cause a commutation state change) motor 100. However, as current is initially applied to the "on" windings of motor 100 to start rotation of rotor 114, there is a di/dt voltage that appears as rotor 114 first begins to rotate that corrupts the back EMF reading at lead connection 1016. This di/dt voltage is caused by saliency, or the preferred direction of magnetization, of motor 100. Ultimately, this causes an unsymmetrical voltage drop to appear across the "off" phase from the "on" phases. Additionally, corruption may occur from as the self-inductance of the two "on" phases may differ slightly and shift the neutral point of voltage away from its true value.

In the embodiment, to reduce the effect of corrupted back EMF readings at rotor 114 start up, back EMF readings after the very first application of current to motor 100 at start up are discounted until the di/dt voltage in the windings of motor 100 decays to a negligible level. For the embodiment, this detection of di/dt voltage decay is performed by comparing the current applied to the "on" windings (which are controlled by motor controller 104 and are known) with the current observed on the "on" windings of motor 100. It will be appreciated that during initial motor start up, the observed current on the "on" windings will include a di/dt component and will appear higher than the supplied current until the di/dt component decays. When the two compared current values are within an acceptable error margin, then it is concluded that the di/dt voltage has decayed to an acceptable level, and that back EMF observations are reliable again.

Referring again to FIG. 7, resistor 702 is provided across which the bus current for phases A, B and C of motor 100 may be sensed. Since bridges 708, 710 and 712 are driven by PWM signals 106 and since PWM signals are applied in six-step commutation, the current sensed across resistor 702 is also the current observed on the two "on" windings of motor 100 energized during each commutation state. The current sense signal from lead connection 704 is provided to DSP board 802 to determine if the observed bus current is within an error margin of the supplied current (as the DSP board 802 is also aware of the current applied to the windings on motor 108). Once it is determined that the two currents are within an acceptable margin of error, then DSP board 802 will determine the back EMF readings at lead connection 1016 as being reliable again.

For the embodiment, the current applied to the two "on" windings of motor 108 may be controlled in a closed loop manner by DSP board 802, for example, to move the current supplied to motor 100 to a current setpoint defined by a user application.

A person of skill in this art can use known DSP process techniques to implant the above features, and such implementation details are not described further herein.

Increased Application of Voltage to Phase Windings

Another feature of an embodiment provides a system and method for increasing the bus voltage that is available to windings 108, 110 and 112 of motor 100 during high-speed motor operation. Referring to FIG. 7, it has been described above that each phase A, B and C of motor 100 is driven by a leg, or branch, 708, 710 and 712 of MOSFETs in inverter bridge 102. For each leg 708, 710 and 712, there is a bootstrap capacitor 718, 720 and 722 connected respectively thereto. Bootstrap capacitors 718, 720 and 722 are each respectively connected in parallel to (i) IC drive circuit 752H and MOSFET 728, (ii) IC drive circuit 754H and MOSFET 730, and (iii) IC drive circuit 756H and MOSFET 732. In the embodiment, bootstrap capacitors 718, 720 and 722 are charged up to the value of the high-side of the voltage bus (shown as +HV, which for example may be +12V) as the low-side MOSFET (i.e., MOSFETs 738, 740 or 752) of the leg associated with the capacitor is on. That is, the capacitor associated with a phase is charging while that phase is driven to the value of the low-side of the voltage bus (shown as −LV, which for example is generally the power or HV ground). The charge on the bootstrap capacitors 718, 720 and 722 may then be used to keep an associated high-side MOSFET 728, 730 or 742 "on" by powering its associated IC drive circuit without the assistance of PWM signals 106. As shown in FIG. 7, capacitors 718, 720 and 722 are connected to a power supply (not shown) that is of lower current than the power rail +HV through diodes 762, 764 and 766, respectively. Diodes 762, 764 and 766 prevent the immediate discharge of capacitors 718, 720 and 722 when MOSFETs 728, 730 and 732 are turned "on", and instead allows the capacitors to discharge as they power their associated IC drive circuits.

Figure 17A:
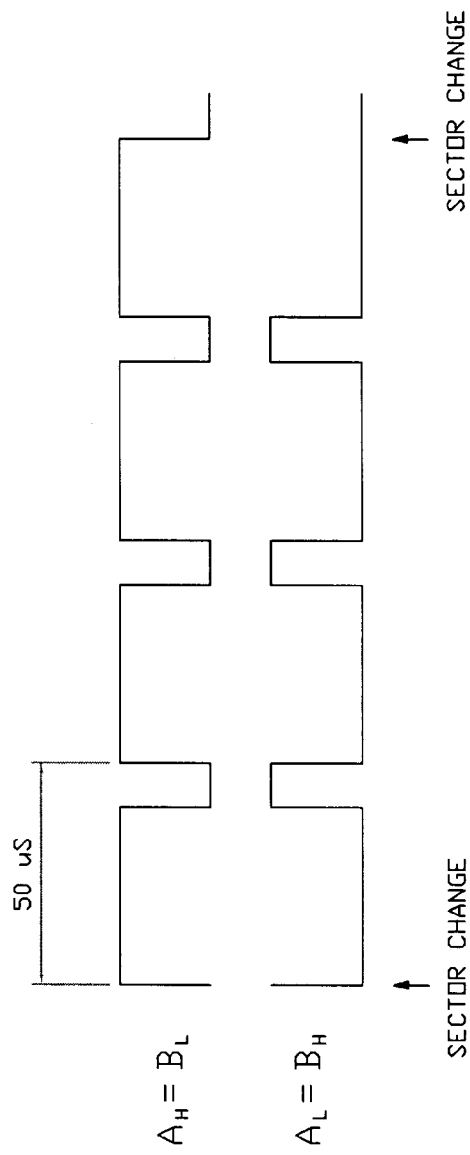
FIG. 17a is a graphical representation of pulse wave modulation waveforms that may be applied to the motor of FIG. 1.

Since a high-side MOSFET (i.e., MOSFET 728, 730 or 742) of a leg cannot be held "on" indefinitely by the charge from an associated bootstrap capacitor, the PWM scheme of motor 100 must turn off the high-side MOSFET periodically, and turn on the low-side MOSFET of the leg to re-charge the bootstrap capacitor. For example, consider commutation state (2) above in which phase A was to be turned "on" to the high value while phase B was to be turned "on" to the low value. For phase A, PWM signals 106 applied at $A_H$ and $A_L$ through IC drive circuits 752H and 752L respectively would be such that low-side MOSFET 738 would be periodically turned on briefly, while high-side MOSFET 728 would be periodically turned off, to allow charging of bootstrap capacitor 718. It will be appreciated that the signals applied at $B_H$ would be identical to $A_L$, while $B_L$ would be identical to $A_H$. Referring to FIG. 17a, the PWM patterns at $A_H$, $A_L$, $B_H$ and $B_L$ are shown for state (2) commutation. As shown, for an exemplary PWM frequency of 20 kHz, at the end of each 50 us interval $A_H$ is turned off briefly, while $A_L$ is turned on at that same time to charge bootstrap capacitor 718. These values are reversed for $B_H$ and $B_L$. This cycling of activation of MOSFETs merely for the purpose of recharging a bootstrap capacitor in-between changes in commutation state (i.e., before the position of rotor 114 changes sectors) tends to reduce the voltage that may be applied to the phase windings 108, 110 and 112 from what is actually available from the high-side voltage bus of motor 100. Generally, this tends to reduce maximum available voltage by approximately 5-10%.

For the embodiment, this reduction of maximum voltage applied to the windings is ameliorated at higher speeds of operation by turning off PWM signal generation at high speeds of rotation for rotor 114. By having a commutation scheme, such as the "six-step" commutation scheme described above with respect to FIG. 3, for which the state changes have the low-side MOSFET of a leg turned on in a preceding state to a state in which the high-end MOSFET of the leg is turned on, the boot strap capacitor may be "pre-charged" so that there is no need to charge and re-charge the capacitor during the commutation state. The charge on capacitors 718, 720 and 722 may then be used to trigger the gates of MOSFETs 728, 730 and 732, respectively, through IC drive circuits 752H, 754H and 756H. This is possible at higher speed motor operation because the time in which rotor 114 stays within a Sector of space 200, and hence the period of time between the commutation state changes, is relatively short so that the charge on the bootstrap capacitor is capable of holding the high-side capacitor of a leg "on" for the entire period without use of a PWM signal to turn off the high-side MOSFET, and turn on the low-side MOSFET, to re-charge the capacitor. For example, considering again the commutation scheme of FIG. 3:

| Commutation State | Status of Phase |
| --- | --- |
| State (1) | Phase A (HI); Phase C (LO) |
| State (2) | Phase A (HI); Phase B (LO) |
| State (3) | Phase C (HI); Phase B (LO) |
| State (4) | Phase C (HI); Phase A (LO) |
| State (5) | Phase B (HI); Phase A (LO) |
| State (6) | Phase B (HI); Phase C (LO) |

Figure 17B:
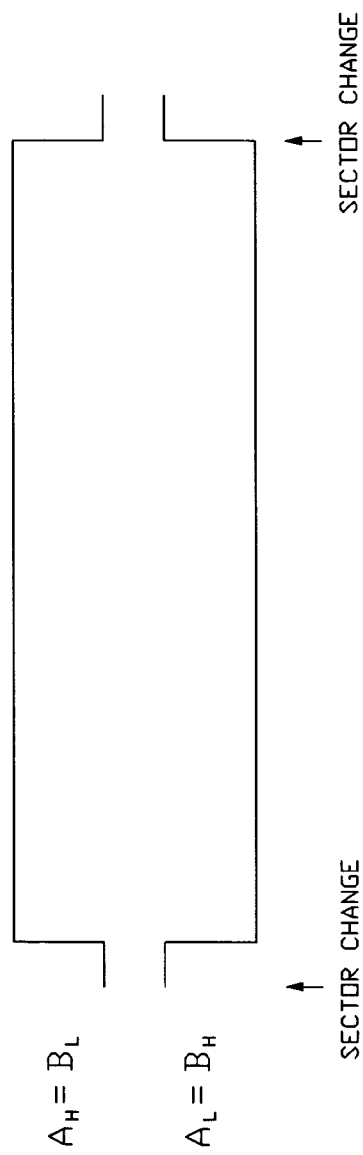
FIG. 17b is a graphical representation of an alternative waveform that may be applied to the motor of FIG. 1.

For this commutation scheme, each leg of a phase has its low-side MOSFET on for two consecutive commutation states, i.e., for the duration that rotor 114 moves through two Sectors of space 200, before going off and then having its high-side MOSFET coming on for two consecutive commutation states. As rotor 114 moves at higher speeds, the period of time for rotation over two Sectors of space 200 shortens, and past a threshold speed (such as 1000 to 1500 rpm in some motor applications), DSP board 802 may stop PWM generator 804 from issuing any more PWM signals for the duration of a commutation state for the active pair of phases, since the charge on the bootstrap capacitor for the phase can hold the high-side MOSFET on for the entire period. Thus, for the example in commutation state (2) in which Phase A is high, and Phase B is low, the PWM signal 106 for $A_H$, $A_L$, $B_H$ and $B_L$ during high speed operation may be simply held at high or low for the entire duration of the commutation state. This is shown for example in FIG. 17b.

During this high speed operation, the bootstrap capacitors are used to trigger and keep the high-side MOSFETS "on" by supplanting PWM signals 106 provided to the IC drive circuits. During this time, the PWM frequency may be slowed to match the commutation state changes, so that PWM signals change only when there is a commutation state change as rotor 114 moves from Sector to Sector of space 200. The maximum average voltage available to the active phase windings of motor 100 tends to increase from that at low speed operation at which PWM signal 106 is constantly turning MOSFETs on and off to recharge the bootstrap capacitors. Advantageously, this tends to additionally decrease switching losses in the MOSFETs of inverter bridge 102 as they are turning on and off with less frequency, and more power may be delivered to the motor.

Noise Attenuated Back EMF Detection

As a further feature, the back EMF readings obtained from lead connection 1016 may be refined. In general, permanent magnet motors, such as motor 100, have some saliency associated with them. Saliency in motor 100 causes self-inductance of a phase winding to be a function of the position of rotor 114, which tends to cause mutual coupling between the two "on" phases of motor 100 with the "off" phase. In addition, the mutual inductance between phase windings 108, 110 and 112 tend to vary as a function of the position of rotor 114. These variations and mutual couplings cause "noise" on the back EMF signal of the "off" phase winding that appears on the back EMF signal at lead connection 1106 (shown in FIG. 10 described above). For instance, as the mutual coupling is a function of rotor 114, noise tends to be induced by the switching of PWM signals 106, because the polarity reversal of PWM signals 106 causes a current change (i.e., di/dt) in the active "on" windings of motor 100 to also reverse signs at the switching frequency. As such, if PWM signals 106 are provided at 20 kHz frequency to motor 100, then a corresponding 20 kHz noise tends to be induced on the back EMF value that is detected at lead connection 1016 due to the interaction of rotor 114 with the mutual coupling.

Figure 18A:
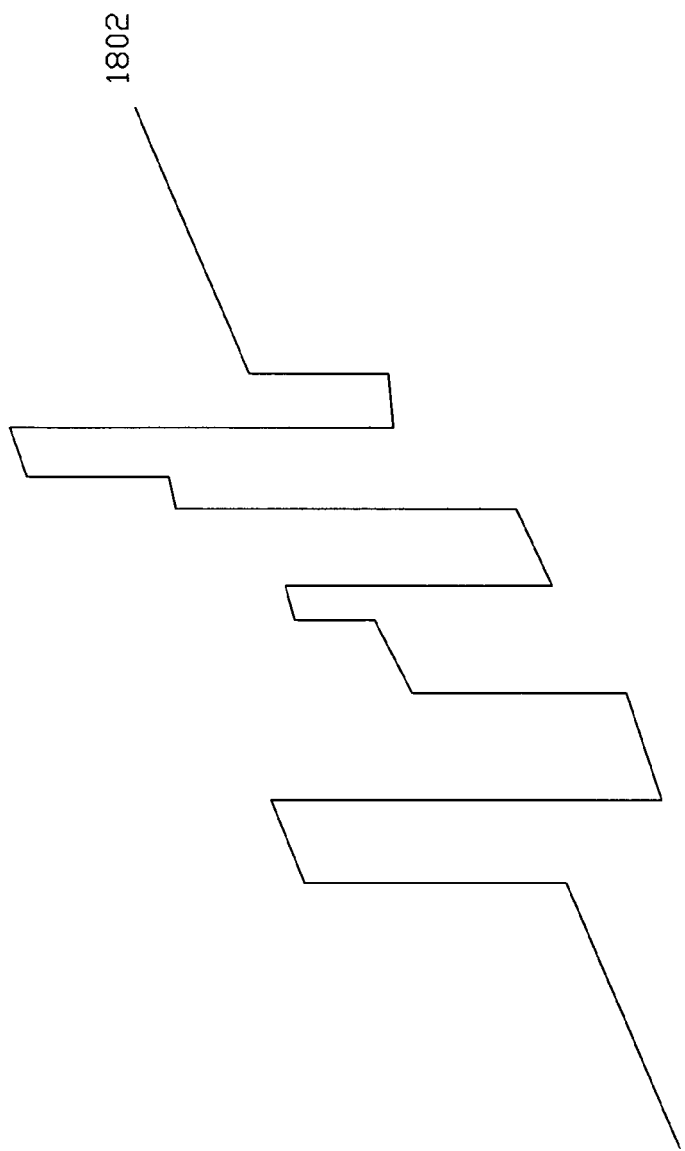
FIG. 18a is a graphical representation of a sector of a non-idealized voltage waveform that may notionally be observed by the averaging circuit of FIG. 10.

Referring to FIG. 11a, an ideal back EMF waveform 1102 is shown. As described above, the ideal back EMF waveform is triangular. However, with noise resulting from saliency of motor 100, the actual back EMF would not be exactly triangular. At the switching frequencies of PWM, such as for example at 20 kHz, there would be ripples on the wave 1102. For example, referring to section 1108 of wave 1102, the section might in actuality appear as wave section 1802 as shown in FIG. 18a.

One way to remove the noise is by way of a filter. A digital filter is preferred to an analog filter, since the phase shift of the back EMF signal caused by a digital filter tends to be much easier to control by DSP board 802 than that for an analog filter. For an analog filter, if the phase shift is not corrected, this may have adverse effects on the commutation of motor 100. However, for a digital filter to be effective, for the embodiment DSP board 802 is set up to digitally over-sample the back EMF observed at lead connection 1016. "Oversampling" in this context refers to the sampling of back EMF at a rate higher than the switching frequency of PWM signals 106. Digital over-sampling is effective because if sampling was only conducted at the switching frequency, aliasing tends to occur. Thus, to avoid aliasing effects, it is preferred to sample at least twice as fast as the highest frequency harmonic. For the embodiment, an exemplary digital filter that may be used to over-sample PWM signals 106 at 20 kHz is a third order Butterworth filter with a cutoff frequency of 10 kHz. For the embodiment, a digital filter is selected to attenuate the 20 kHz noise signal by at least 12 dB but provide no more than a minimal, such as about 10 degrees, phase shift on the highest expected frequency that is to be filtered. The implementation of such a digital filter on DSP board using DSP code is well known to a person of skill in this art, and is not described in greater detail herein.

Referring for example to the PWM situation for phases A and B described above with respect to FIG. 17*a* during lower speed motor operation, recall that for that example, phase A was to be "on" with respect to the high-side voltage, while phase B was to be "on" with respect to the low-side voltage. The PWM switching leads to noise that appears on the back EMF voltage observed at lead connection 1016, as shown in FIG. 18*b*.

Figure 18B:
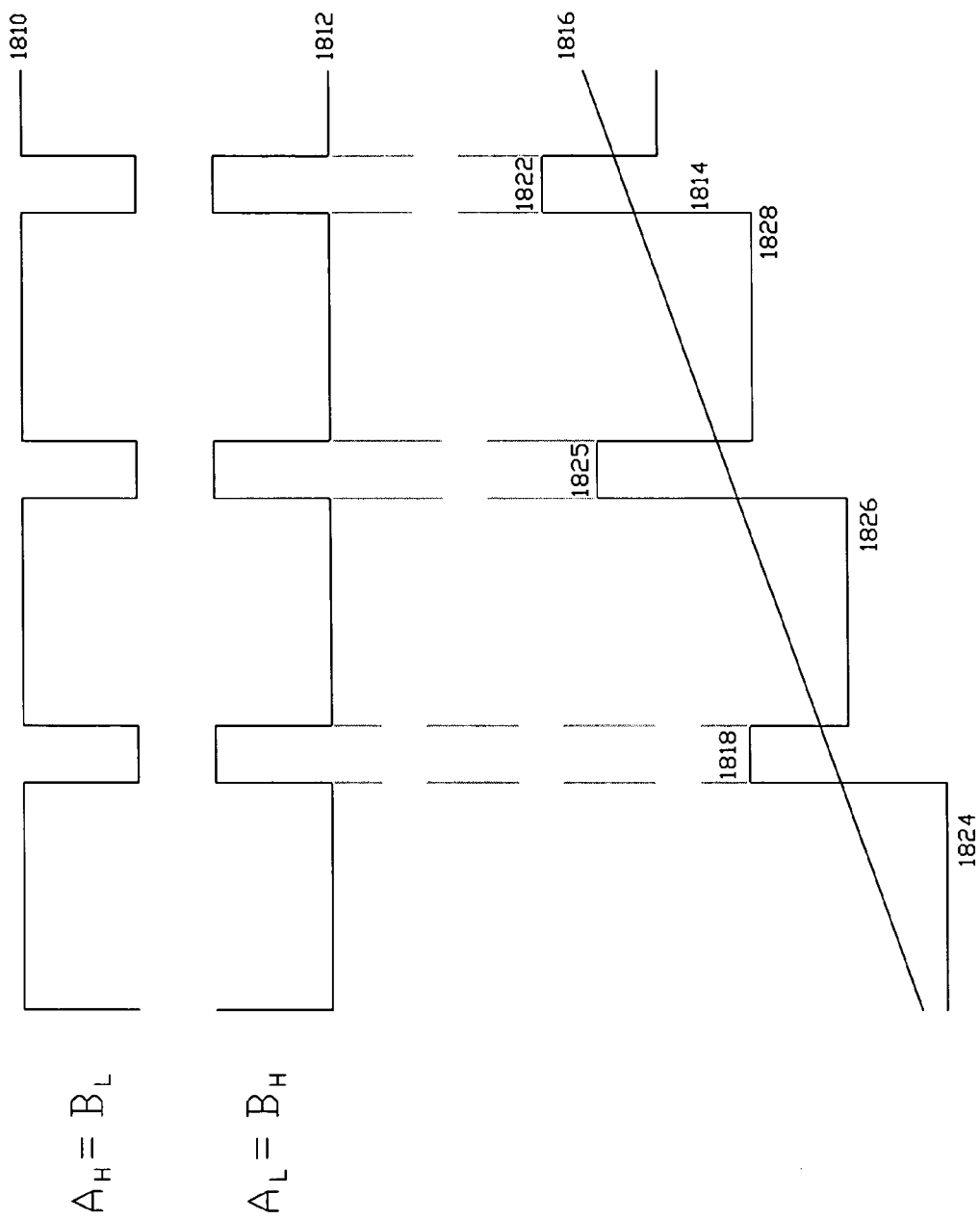

In FIG. 18*b*, the same PWM signal 106 to be applied to $A_H$ ($B_L$) and $B_H$ ($A_L$) are shown as PWM waves 1810 and 1812 respectively. Corresponding to that is a notional back EMF wave 1814 that may be observed at lead connection 1016 with noise fluctuations occurring at the switching frequency of PWM waves 1810 and 1812. For the embodiment, DSP board 802 over-samples back EMF wave 1814 by sampling twice within a switching cycle of PWM waves 1810 and 1812, once at the midpoint of the high-side of the switching cycle (at points 1818, 1820 and 1822 shown in FIG. 18*b*) and once at the midpoint of the low-side of the switching cycle (at points 1824, 1826 and 1828 shown in FIG. 18*b*). It will be appreciated that other over-sampling rates may be used, so long as at least one measurement is taken at the high-side and one at the low-side is taken for each switching cycle. While FIG. 18*b* is not entirely to scale, for the embodiment over-sampling to remove 20 kHz noise as described above should be at least at twice the frequency (i.e., 40 kHz) and have samples that occur equally spaced in time.

From the samples, such as those taken at points 1818, 1824, 1820, 1828, 1822 and 1828, may be filtered past a digital filter by DSP board 802 to produced a filtered back EMF signal that has reduced noise components, such as filtered back EMF waveform 1816 shown in FIG. 18*b*.

Although the example of FIG. 18*b* is for lower speed motor operation, it will be appreciated that since PWM switching will occur even with high speed motor operation, the noise filtering technique described above may be applied during any speed of motor operation.

It will be appreciated from the above examples that a myriad of components may be used to implement embodiments of the invention. Each method described above may be implemented using the motor control circuitry shown. Signal processing techniques embodying the method can be provided through known software programming techniques for the related digital signal processor or other processors associated with a motor in different embodiments.

Although the invention has been described with reference to certain specific embodiments, various modifications thereof will be apparent to those skilled in the art without departing from the spirit and scope of the invention as outlined in the claims appended hereto.

I claim:
1. A method for determining an initial position of a rotor of a polyphase motor comprising:
   determining current change values from a plurality of phases of the motor during saturation of the motor relating to the initial position of the rotor;
   identifying a set of modelled current change values according to a modelled behaviour of the motor, the modelled current change values representing modelled positions of the rotor under the modelled behaviour;
   transforming the current change values into a lower dimensional space;
   transforming the set of modelled current values into the lower dimensional space; and
   comparing the current change values in said lower dimensional space to the set of modelled current change values in said lower dimensional space to identify the initial rotor position from the modelled positions,
wherein each current change value of said current change values is obtained by:
   providing a first voltage pulse having a magnitude and duration to a pair of phases of the plurality of phases in a first direction; and observing a first resulting current appearing on the pair of phases;
   providing a second voltage pulse having said magnitude and said duration of said first voltage pulse to the pair of phases in a second direction opposed to the first direction; and
   observing a second resulting current appearing on the pair of phases; and
   obtaining the each current change value as the difference between the first resulting current and the second resulting current.

2. The method of claim 1, wherein the motor is a three-phase motor.

3. The method of claim 2, wherein each current change value relates to a respective pair of phases of the motor.

4. The method of claim 3, wherein the current change values are a triplet of values, and which are transformed into an ordered pair in the lower dimensional space.

5. The method of claim 4, wherein the rotor rotates around a rotational space of the motor divided into a plurality of sectors, and each value of the set of modelled current change values corresponds to the modelled behaviour of the motor when the rotor is at a midpoint of each of the respective plurality of sectors.

6. The method of claim 5, wherein the comparing the current change values and the modelled current change values comprises identifying the rotor by:
   obtaining a set of differences between the current change values to each modelled current change value at the midpoint of of a each sector of a plurality of sectors of rotational space of the motor, said each sector being associated with a respective modelled current change value at the midpoint of the sector;
   determining a difference in the set of differences that is the smallest, and the sector of the plurality of sectors associated with the difference that is the smallest; and
   identifying the rotor as within the sector of the plurality of sectors associated with the difference that is the smallest.

7. A system for determining an initial position of a rotor of a polyphase motors, comprising:
  sense circuitry for determining current change values from a plurality of phases of the motor during saturation of the motor relating to the initial position of the rotor; and
  a motor controller that
    accesses a set of modelled current change values according to a modelled behaviour of the motor, the modelled current change values representing modelled positions of the rotor under the modelled behaviour;
    transforms the set of modelled current values into a lower dimensional space;
    receives the current change values from the sense circuitry and transforms the current change values into the lower dimensional space;
    compares the current change values in the lower dimensional space to the set of modelled current change values in the lower dimensional space to identify the initial rotor position from the modelled positions;
    provides a first voltage pulse having a magnitude and duration to a pair of phases of the plurality of phases in a first direction;
    obtains from the sense circuitry a first resulting current appearing on the pair of phases;
    provides a second voltage pulse having said magnitude and duration of said first voltage pulse to the pair of phases in a second direction opposed to the first direction;
    obtains from the sense circuitry a second resulting current appearing on the pair of phases; and
    obtains each current change value of the current change values as the difference between the first resulting current and the second resulting current.

8. The system of claim 7, wherein the motor is a three-phase motor.

9. The system of claim 8, wherein each current change value relates to a respective pair of phases of the motor.

10. The system of claim 9, wherein the current change values are a triplet of values, and which are transformed into an ordered pair in the lower dimensional space.

11. The system of claim 10, wherein the rotor rotates around a rotational space of the motor divided into a plurality of sectors, and each value of the set of modelled current change values corresponds to the modelled behaviour of the motor when the rotor is at a midpoint of each of the respective plurality of sectors.

12. The system of claim 11, wherein the comparing the current change values and the modelled current change values by the motor controller comprises identifying the rotor by:
  obtaining a set of differences between the current change values to each modelled current change value at the midpoint of a each sector of a plurality of sectors of rotational space of the motor, said each sector being associated with a respective modelled current change value at the midpoint of the sector;
  determining a difference in the set of differences that is the smallest and a sector of the plurality of sectors associated with the difference that is the smallest; and
  identifying the rotor as within a sector of the plurality of sectors associated with the difference that is the smallest.

13. The system of claim 12, wherein the motor controller includes a digital signal processor.

14. A motor controller used in system that determines an initial position of a rotor of a polyphase motor, the motor controller comprising instructions operating on a microprocessor:
  to access a set of modelled current values according to a modelled behaviour of the motor, the modelled current change values representing modelled positions of the rotor under the modelled behaviour;
  to transform the set of modelled current values into a lower dimensional space;
  to receive current change values from sense circuitry in the system and transforms the current change values into the lower dimensional space and to compare the current change values in the lower dimensional space to the set of modelled current change values in the lower dimensional space to identify the initial rotor position from the modelled positions;
  to provide a first voltage pulse having a magnitude and duration to a pair of phases of the plurality of phases in a first direction;
  to obtain from the sense circuitry a first resulting current appearing on the pair of phases; to provide a second voltage pulse having said magnitude and duration of said first voltage
  pulse to the pair of phases in a second direction opposed to the first direction;
  to obtain from the sense circuitry a second resulting current appearing on the pair of phases; and
  to obtain each current change value of the current change values as the difference between the first resulting current and the second resulting current,
wherein the sense circuitry determines said current change values from a plurality of phases of the motor during saturation of the motor relating to the initial position of the rotor.

15. The motor controller of claim 14, wherein the motor is a three-phase motor.

16. The motor controller of claim 15, wherein said each current change value relates to a respective pair of phases of the motor.

17. The motor controller of claim 16, wherein said current change values are a triplet of values, which are transformed into an ordered pair in the lower dimensional space.

18. The motor controller of claim 14, wherein motor controller includes instructions operable on said microprocessor to identify the rotor by:
  obtaining a set of differences between the current change values to each modelled current change value at the midpoint of each sector of a plurality of sectors of rotational space of the motor, said each sector being associated with a respective modelled current change value at the midpoint of the sector,
  determining a difference in the set of differences that is the smallest and a sector of the plurality of sectors associated with the difference that is the smallest; and
  identifying the rotor as within a sector of the plurality of sectors associated with the difference that is the smallest.

* * * * *